(12) United States Patent
Ogura

(10) Patent No.: US 9,502,801 B2
(45) Date of Patent: Nov. 22, 2016

(54) ELECTRIC APPARATUS HAVING A PLATE-SHAPED MALE TERMINAL WITH A LEVEL DIFFERENCE IN ITS THICKNESS DIRECTION

(71) Applicant: MAKITA CORPORATION, Anjo-shi, Aichi (JP)

(72) Inventor: Hironori Ogura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 15/019,349

(22) Filed: Feb. 9, 2016

(65) Prior Publication Data

US 2016/0294093 A1 Oct. 6, 2016

(30) Foreign Application Priority Data

Apr. 2, 2015 (JP) .................................. 2015-075970

(51) Int. Cl.
| | |
|---|---|
| H01R 13/02 | (2006.01) |
| H01R 13/11 | (2006.01) |
| H01R 4/26 | (2006.01) |
| H01R 13/04 | (2006.01) |

(52) U.S. Cl.
CPC .............. *H01R 13/113* (2013.01); *H01R 4/26* (2013.01); *H01R 13/02* (2013.01); *H01R 13/04* (2013.01)

(58) Field of Classification Search
CPC  H01R 1313/02; H01R 13/04; H01R 13/055; H01R 13/08; H01R 13/112
USPC .................................................. 439/890–891
See application file for complete search history.

(56) References Cited

U.S. PATENT DOCUMENTS

| | | | | |
|---|---|---|---|---|
| 6,030,722 A * | 2/2000 | Kuboshima | ........... | H01M 2/206 429/178 |
| 6,350,149 B1* | 2/2002 | Nakane | ............... | H01M 2/1022 439/500 |
| 8,282,413 B2* | 10/2012 | Fukumoto | ................. | B25F 5/00 439/500 |
| 8,562,371 B2* | 10/2013 | Biesse | .................. | H01R 4/4854 439/352 |
| 9,112,292 B2* | 8/2015 | Ogura | .................... | H01R 13/11 |
| 9,318,729 B2* | 4/2016 | Ogura | ................. | H01M 2/1055 |
| 2011/0250780 A1* | 10/2011 | Fukumoto | ................. | B25F 5/00 439/374 |
| 2013/0049477 A1 | 2/2013 | Tozawa et al. | | |
| 2013/0244504 A1* | 9/2013 | Ogura | .................... | H01R 13/11 439/759 |

FOREIGN PATENT DOCUMENTS

| | | |
|---|---|---|
| JP | 2013-042672 A | 3/2013 |
| JP | 2013-230553 A | 11/2013 |

* cited by examiner

*Primary Examiner* — Chandrika Prasad
(74) *Attorney, Agent, or Firm* — Oliff PLC

(57) ABSTRACT

A female and male connecting structure is provided between a battery pack and a tool main body such that the battery is slidably attached and electrically connected to the tool main body. The female and male connecting structure includes male terminals provided on the tool main body and female terminals provided on the battery pack. A level difference is formed by a concave portion on a sliding surface of terminal portions of the male terminal in a thickness direction of the plate-shaped male terminal. The level difference is made at a plurality of positions to form concavo-convex portions. The sliding surface corresponds to an area with which a contact point of the female terminal comes into sliding contact, and oxidized films formed on the surfaces of the terminal portions can be removed and/or scraped by the concavo-convex portions.

16 Claims, 19 Drawing Sheets

ELECTRIC APPARATUS HAVING A PLATE-SHAPED MALE TERMINAL WITH A LEVEL DIFFERENCE IN ITS THICKNESS DIRECTION

CROSS-REFERENCE

This application claims priority to Japanese patent application serial number 2015-075970, filed on Apr. 2, 2015, the contents of which are incorporated fully herein.

BACKGROUND

1. Technical Field

The present invention generally relates to an electric apparatus including a male terminal to be electrically connected to a female terminal of another electric apparatus by being slid with respect to the female terminal.

2. Background Art

In electric power tools of recent years, a battery pack for an electric power tool, which is also referred to as only a battery pack, is used as a power source for the electric power tool. When an amount of charge becomes low, the battery pack is removed from a tool main body by sliding the battery pack and then charged by a dedicated charger. After the charging is completed by the dedicated charger, the battery pack is attached again to the tool main body by sliding the battery pack with respect to the tool main body. Occasionally, such battery packs may be used via a dedicated adapter when used as a power source for the electric power tool. Hereinafter, the tool main body, the dedicated charger, and the adapter to which the battery pack is attached are referred to collectively as "electric apparatus".

An electrical connection of the battery pack with respect to the electric apparatus can be made by inserting a male terminal provided on the electric apparatus into a female terminal provided on the battery pack. In more detail, for example, the female terminal provided on the battery pack is configured such that metallic terminals of the female terminal are arranged so as to oppose each other, and the male terminal is inserted between the metallic terminals of the female terminal, so that the female terminal and the male terminal are electrically connected to each other. Furthermore, the male terminal provided on the electric apparatus is configured to have a plate shape which can be pinched and/or held between the female terminal as described above. The male terminal having the plate shape extends in a sliding direction to allow insertion of the male terminal into the female terminal. The metallic terminals of the female terminal, which are arranged so as to oppose each other, come into contact with the male terminal by pinching the male terminal by an elastic force. An energization state, i.e. an electrically connected state, between the male terminal and the female terminal can be achieved by this contact. Japanese Laid-Open Patent Publication No. 2013-42672 and Japanese Laid-Open Patent Publication No. 2013-230553 disclose the configurations as described above.

Regarding the female and male terminals described above, there are cases where oxidized films may be formed by energization on surfaces of the female terminal and the male terminal. Such oxidized films may cause interruption of the energization between the female terminal and the male terminal. Therefore, removal of the oxidized films such formed may be desired as much as possible. However, if such removal of the oxidized films needs to be performed by an individual user, an excessive burden on the user may be increased for managing the tool, and there may arise a complicated work, which may be troublesome for the user.

Thus, there is a need in the art to provide an electric apparatus (electric power tools, electric operating machines, chargers, and adapters) having a male terminal to be electrically connected to a female terminal by being slid with respect to the female terminal, in which oxidized films formed on the surfaces of the female terminal can be removed without increasing a burden on the user for managing the electric apparatus.

SUMMARY

Generally speaking, the present disclosure relate to an electric apparatus having a male terminal, and the electric apparatus may be configured to be attached to a battery pack having a female terminal. Furthermore, the male terminal may be configured to be electrically connected to the female terminal by sliding the battery pack relatively with respect to the electric apparatus such that the male terminal is inserted to the female terminal in a sliding direction to come into elastic contact with the female terminal. Furthermore, the male terminal may be configured to have a plate shape, and may extend in the sliding direction and include a side surface with which the female terminal comes into sliding contact. Furthermore, a level difference portion may be provided in a thickness direction of the male terminal on the side surface of the male terminal, and the level difference portion may be configured to include an area in which the female terminal comes into sliding contact with the male terminal.

According to this embodiment, the level difference portion may be formed on the side surface of the male terminal in the thickness direction of the plate, i.e. the male terminal. The level difference portion may include an area with which the female terminal comes into sliding contact during the slide movement. Therefore, oxidized films formed on the surfaces of the terminals can be removed and/or scraped by a concavo-convex shape of the level difference portion. Because of this configuration, the oxidized films formed on the surfaces of the male terminal can be removed without increasing an excessive burden on a user for managing the electric apparatus. Accordingly, the electrical connection between the female terminal and the male terminal may be advantageously and/or desirably maintained.

In one exemplary embodiment of the present disclosure, the level difference portion may be provided on both side surfaces of the male terminal. In this configuration, the oxidized films formed on both of the side surfaces of the male terminal may be removed and/or scraped as described above. Accordingly, the electrical connection between both of the side surfaces of the male terminal may be advantageously and/or desirably maintained.

In another exemplary embodiment of the disclosure, the electric apparatus may have a signal terminal configured to transmit and receive a signal to and from the battery pack, and the signal terminal may be a male terminal, and the level difference portion may be formed in at least one of the male terminals except for the signal terminal. The level difference portion may be an attaching and/or removing resistance when the battery pack for the electric power tool is sled to attach and/or remove the battery pack to and/or from the electric apparatus. Furthermore, regarding the signal terminal, a low signal voltage may be applied to the signal terminal. For example, a signal voltage that is not higher than 5V may be applied to the signal terminal. In more detail, a signal voltage of 3.3V may be applied to the signal terminal for transmitting a signal. Therefore, the oxidized films described above may be less likely to be formed on the surfaces of the signal terminal. In this configuration, an unnecessary level difference portion that may cause the attaching and/or removing resistance may be eliminated while the oxidized films may be preferably removed and/or scraped at desired positions. Accordingly, the battery pack for the electric power tool may be easily and desirably attached to and/or removed from the electric apparatus.

In another exemplary embodiment of the disclosure, the side surface of the male terminal may include a planar connection portion with which the female terminal comes into electrically contact when a slide movement of the battery pack with respect to the electric apparatus is completed. A state where the slide movement is completed may include, for example, "a state in which a relationship between the battery pack for the electric power tool and the electric apparatus is fixed by an engagement structure provided between the battery pack for electric power tool and the electric apparatus". Because of this construction, after the slide movement is finished, the female terminal may come into contact with the male terminal at the planar connecting portion of the male terminal, not at the level difference portion. Accordingly, the contact of the female terminal with respect to the male terminal may not be hindered by the level difference portions, so that the electrical contact between the female terminal and the male terminal may be advantageously and/or desirably maintained.

In another exemplary embodiment of the disclosure, the level difference portion may be configured such that the side surface of the male terminal is concaved from the planar connecting portion in a thickness direction of the male terminal. Furthermore, in another exemplary embodiment of the disclosure, the level difference portion may be configured such that a through hole penetrates through the planar connection portion. In this configuration, since the level difference portion is concavely formed in the thickness direction with respect to the planar connecting portion or a through hole is formed in a thickness direction of the male terminal, the oxidized film formed on the surface of the terminal can be removed and/or scraped by the level difference portion.

In another exemplary embodiment of the disclosure, the level difference portion may be configured such that the side surface of the male terminal is protruded from the planar connecting portion in a thickness direction of the male terminal. In this configuration, since the level difference portion is protrudingly formed in the thickness direction with respect to the planar connecting portion, the oxidized film formed on the surface of the terminal can be removed and/or scraped by the level difference portion.

In another exemplary embodiment of the disclosure, the level difference portion may have a linear shape extending in a direction intersecting the sliding direction. In this configuration, since the level difference portion has the linear shape extending in a direction which intersects the sliding direction, the oxidized film formed on the surface of the terminal may be removed and/or scraped upon the slide movement.

In another exemplary embodiment of the disclosure, the level difference portion may also intersect a direction orthogonal to the sliding direction. Because of this construction, since the level difference may also intersect the direction orthogonal to the sliding direction, the removed and/or scraped oxidized film remaining in the convex portions can be moved in the direction intersecting the sliding direction upon the slide movement. Accordingly, the oxidized films removed and/or scraped from the level difference of the male terminal can be discharged from the surface of the male terminal.

In another exemplary embodiment of the disclosure, it may be configured such that a plurality of the planar connecting portions of the male terminal are located at a distance in the sliding direction to correspond to a plurality of contact points of the female terminal located at a distance in the sliding direction.

Because of this construction, the electric contact points between the female terminal and the male terminal can be reliably and/or desirably obtained, and thus mutual electric connection between the female terminal and the male terminal can be reliably and/or satisfactorily obtained. The planar connection portions corresponding to the contact points of the female terminals may be provided such that there are two areas that include the above-described concave portions, or such that the concave portions are provided along the entire sliding surface.

In another exemplary embodiment of the disclosure, a first male terminal and a second male terminal may be provided. Furthermore, it may be configured such that a level difference portion of the first male terminal is brought into sliding contact with a contact point of a first female terminal at the same time when a level difference portion of the second male terminal is brought into sliding contact with a contact point of the second female terminal. Furthermore, the first male terminal may be configured to correspond to a positive terminal of a power source, and the second male terminal may be configured to correspond to a negative terminal of the power source. Because of this construction, sliding resistance of the battery pack for the electric power tool when the contact point of the female terminal climbs over the level difference portion may be received in a balanced manner by the arrangement of the negative and positive terminals. Accordingly, a sliding posture and/or direction of the battery pack for the electric power tool may be maintained easily and/or desirably, and thus operability may be improved during the slide movement.

In another exemplary embodiment of the disclosure, the electric apparatus may be an electric power tool. Because of this construction, the oxidized films formed on the surfaces of the terminal can be removed from the electric power tool without increasing a burden on the user for managing the electric power tool, so that electrical connection between the female terminal and the male terminal can be maintained desirably and/or satisfactorily over a long period.

In another exemplary embodiment of the disclosure, the electric apparatus may be an electric operating machine. Because of this construction, the oxidized films formed on the surfaces of the terminal can be removed from the electric operating machine without increasing a burden on the user for managing the electric operating machine, so that electrical connection between the female terminal and the male terminal can be maintained desirably and/or satisfactorily over a long period.

In another exemplary embodiment of the disclosure, the electric apparatus may be a charger. Because of this construction, the oxidized films formed on the surfaces of the terminal can be removed from the charger without increasing a burden on the user for managing the charger, so that electrical connection between the female terminal and the male terminal can be maintained desirably and/or satisfactorily over a long period.

In another exemplary embodiment of the disclosure, the electric apparatus may be an adapter that is placed between the battery pack and another apparatus. Because of this construction, the oxidized films formed on the surfaces of the terminal can be removed from the adapter without increasing a burden on the user for managing the adapter, so that electrical connection between the female terminal and the male terminal can be maintained desirably and/or satisfactorily over a long period.

DETAILED DESCRIPTION

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures, components and/or devices are shown in block diagram form in order to avoid obscuring significant aspects of the exemplary embodiments presented herein.

First Embodiment

Figure 1:
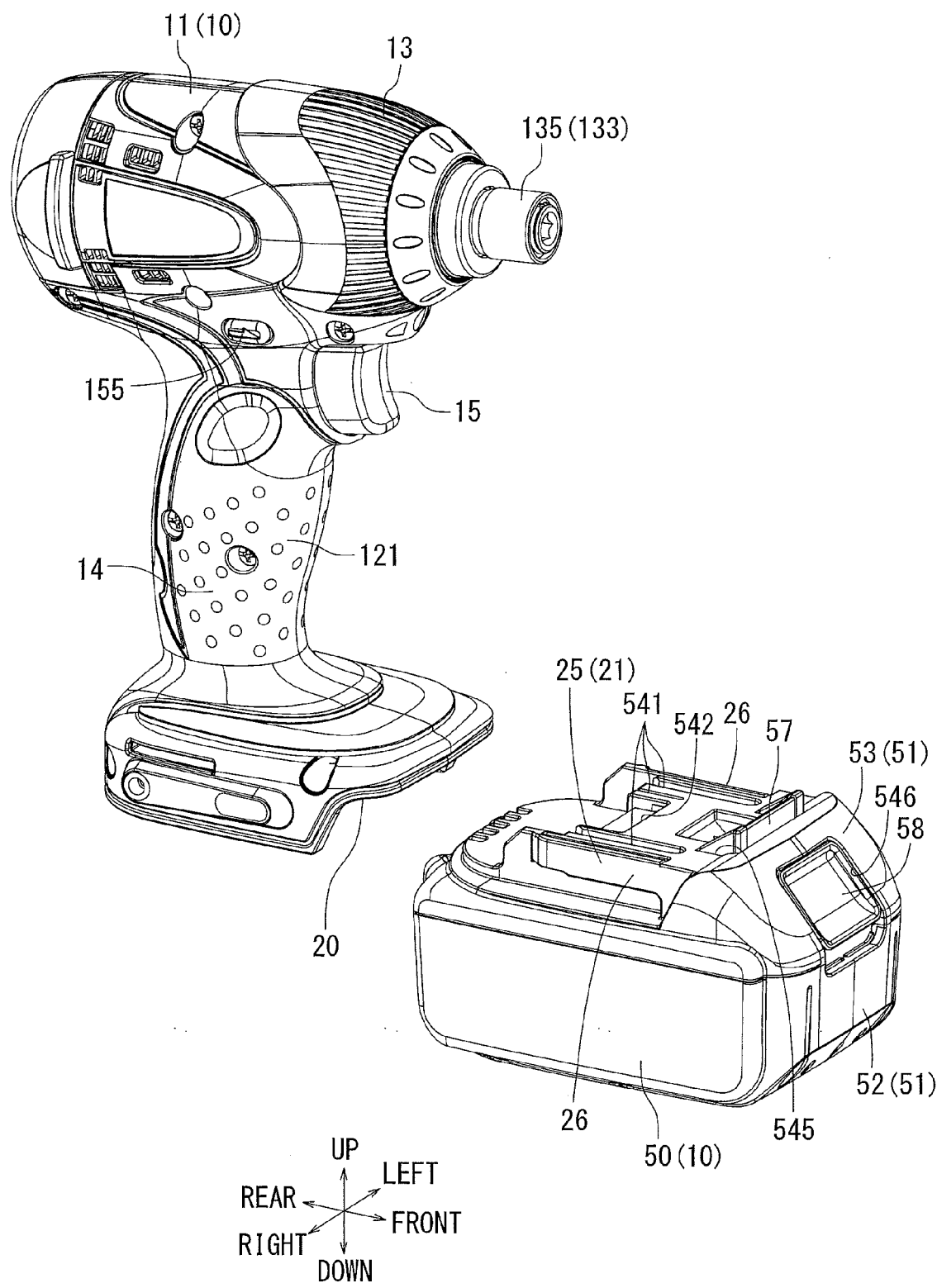
FIG. 1 is a perspective view of an impact driver from which a battery pack is removed.
Figure 2:
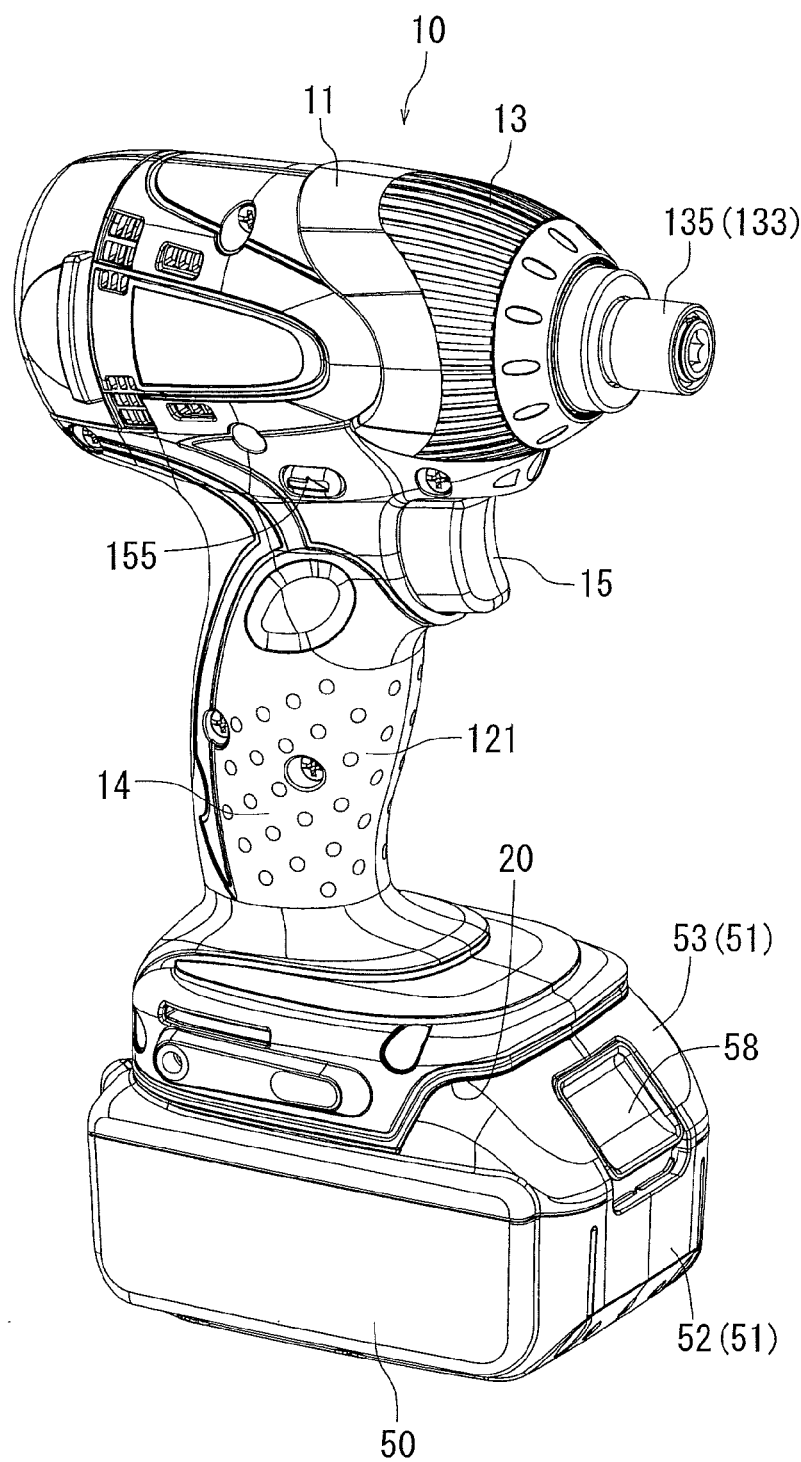
FIG. 2 is a perspective view of the impact driver to which the battery pack is attached.
Figure 3:
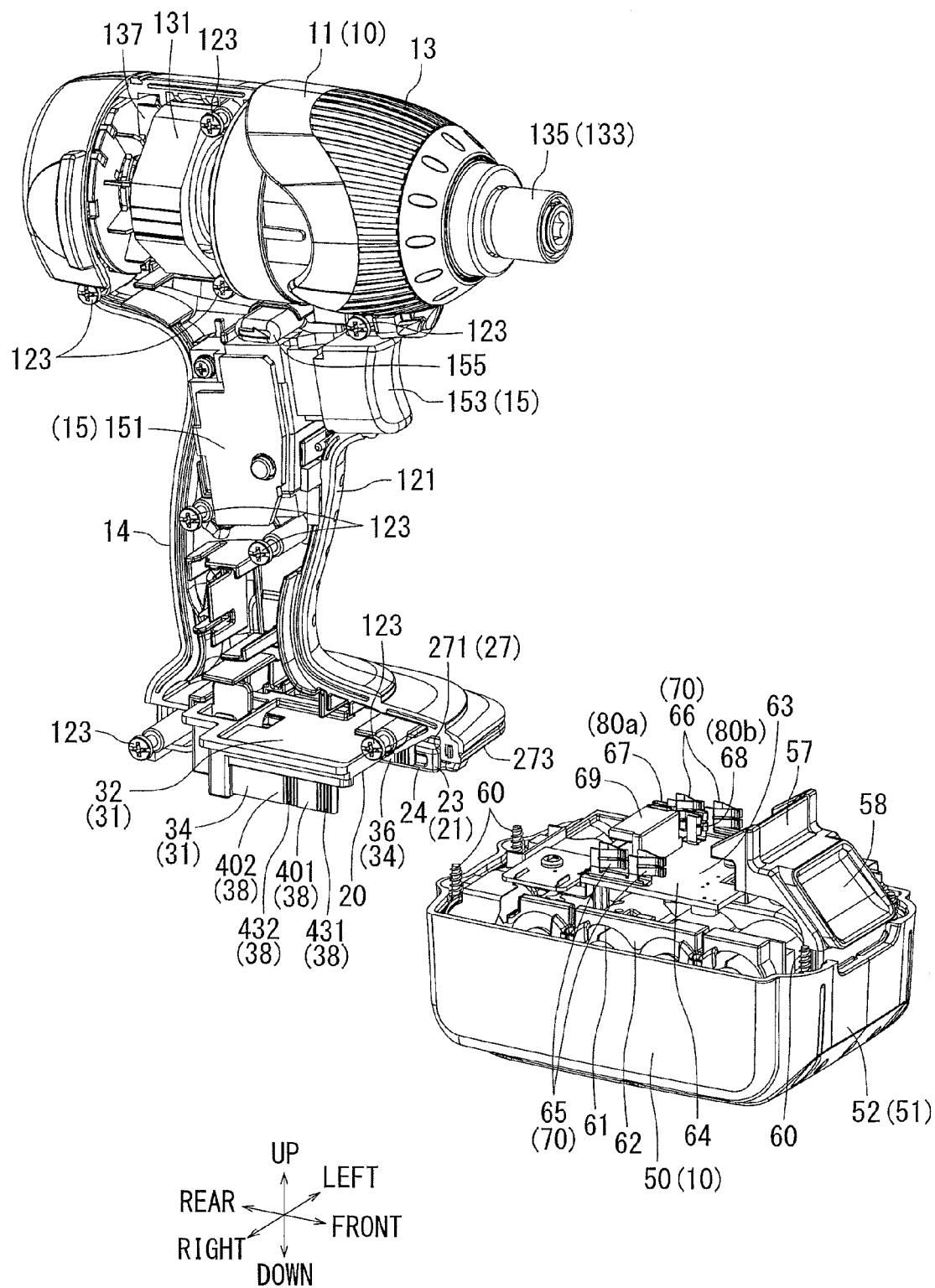
FIG. 3 is a perspective view illustrating an internal structure of a tool main body and the battery pack that are illustrated in FIG. 1.
Figure 4:
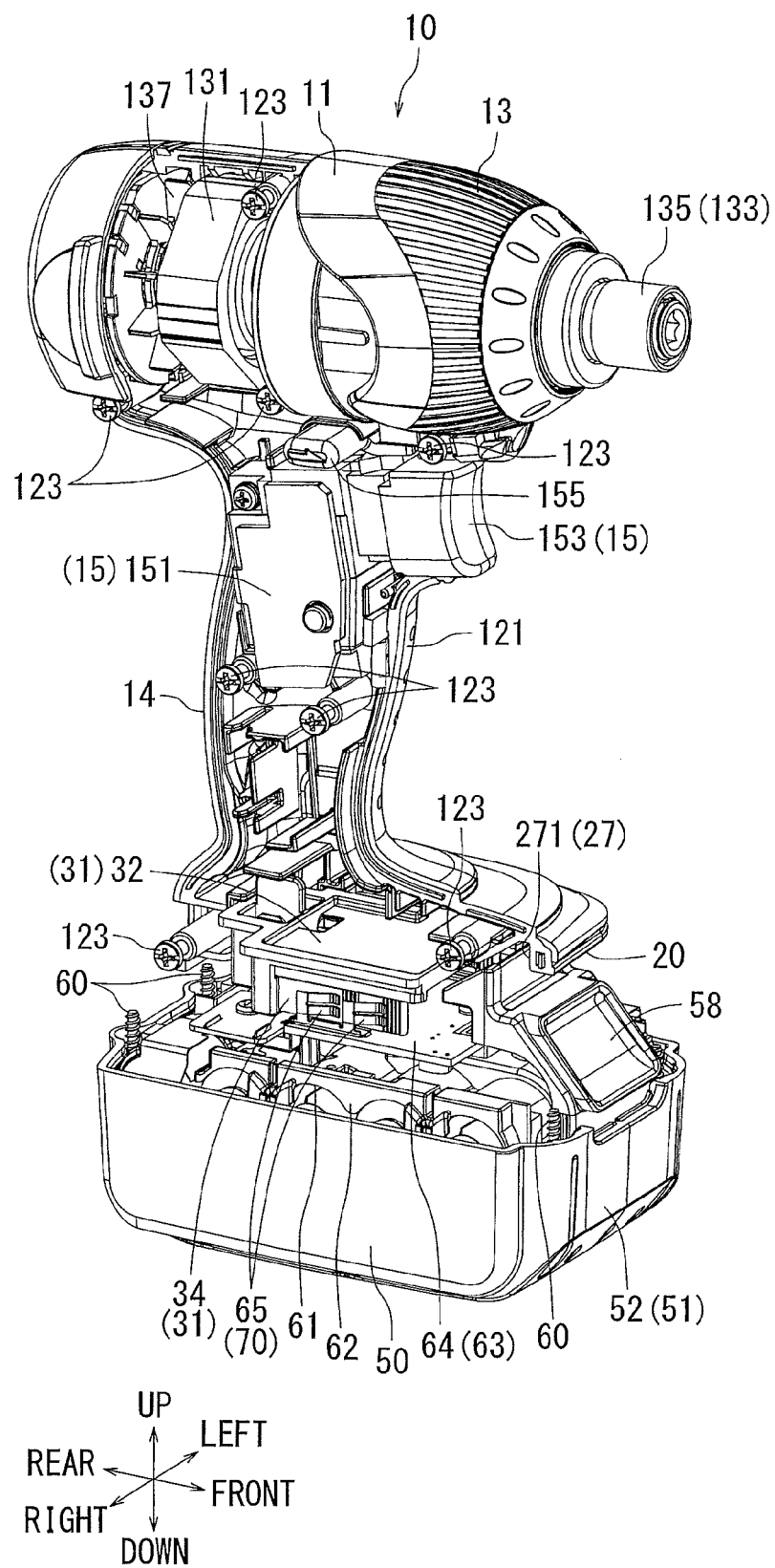
FIG. 4 is a perspective view illustrating an internal structure of the tool main body and the battery pack that are illustrated in FIG. 2.
Figure 5:
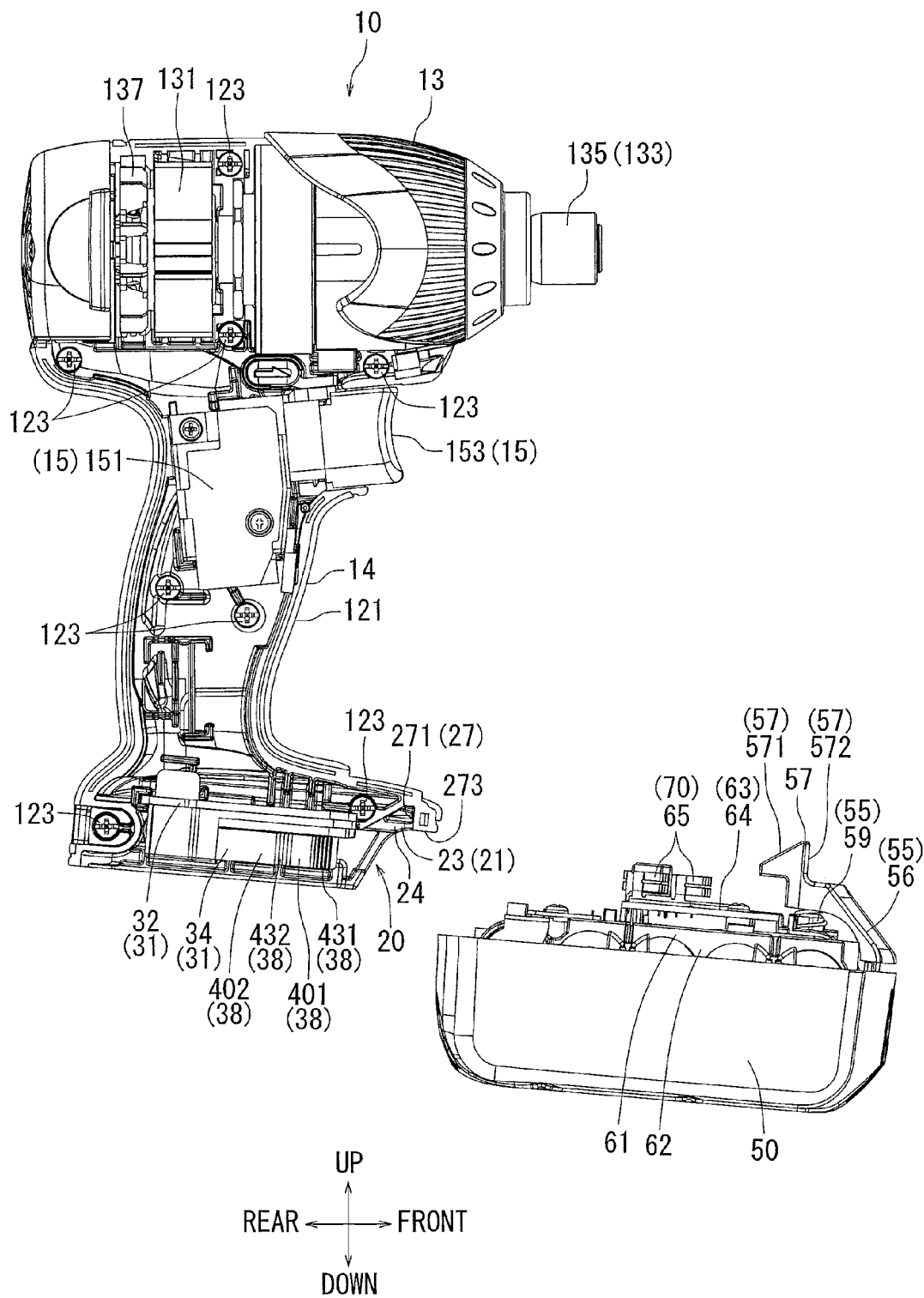
FIG. 5 is a side view illustrating an internal structure illustrated in FIG. 3.
Figure 6:
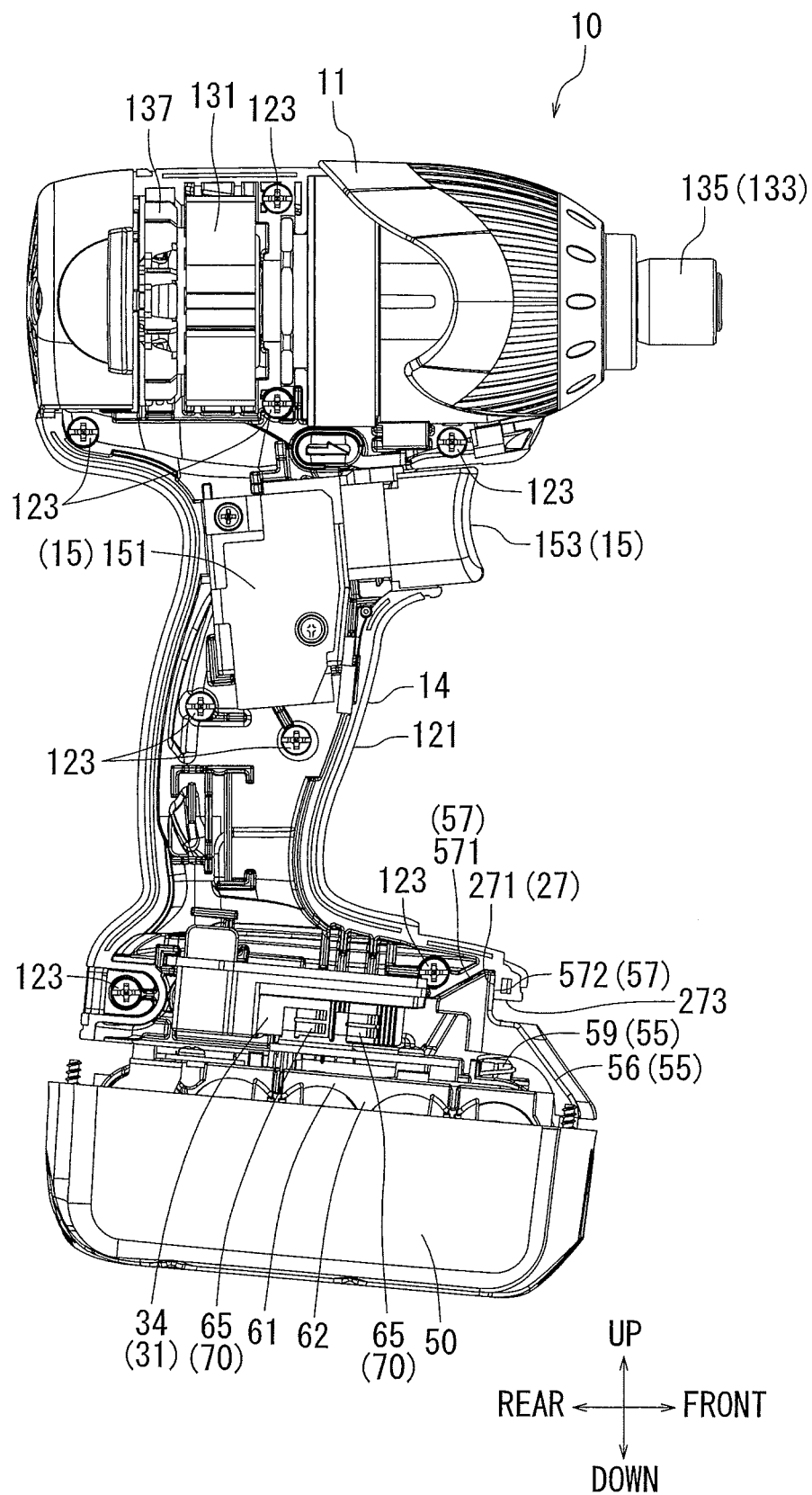
FIG. 6 is a side view illustrating an internal structure illustrated in FIG. 4.

Referring now to FIG. 1 to FIG. 14, an embodiment of an electric apparatus of the invention will be described below. FIG. 1 is a perspective view of an impact driver 10 from which a battery pack 50 is removed. FIG. 2 is a perspective view of the impact driver 10 to which the battery pack 50 is attached. FIG. 3 is a perspective view illustrating an internal structure of a tool main body 11 and the battery pack 50 in FIG. 1. FIG. 4 is a perspective view illustrating an internal structure of the tool main body 11 and the battery pack 50 illustrated in FIG. 2. FIG. 5 is a side view illustrating the internal structure illustrated in FIG. 3. Furthermore, FIG. 6 is a side view illustrating the internal structure illustrated in FIG. 4. A first embodiment of the electric apparatus of the present invention will be described below, in which the battery pack 50 is attached to the impact driver 10.

The impact driver 10 corresponds to the electric power tool of the present embodiment. The impact driver 10 may be driven when the battery pack 50 is attached to the tool main body 11 as a power source. The tool main body 11 may correspond to the electric apparatus to which the battery pack for the electric power tool of the present embodiment is attached. Furthermore, the battery pack 50 may correspond to the battery pack for the electric power tool according to the present embodiment. The battery pack 50 may be detachably attached to the tool main body 11 as the power source of the impact driver 10. When an amount of charge becomes low, the battery pack 50 may be detached from the tool main body 11 and charged by a dedicated charger. The battery pack 50 charged by the dedicated charger may be attached again to the tool main body 11 as the power source of the electric power tool such as the impact driver 10.

As illustrated in FIG. 1 and FIG. 2, the tool main body 11 may generally include a drive unit 13, a grip portion 14, and a battery attachment portion 20. An outer shell of the drive unit 13 and the grip portion 14 may be formed by an integrated housing 121. Various components that constitute the tool main body 11 may be accommodated in the housing 121. A brushless DC motor 131 configured to rotationally drive a motor shaft (not illustrated) may be housed in the housing 121 that includes the drive unit 13. The brushless DC motor 131 may be a drive source of the tool main body 11 and configured to rotationally drive the motor shaft (not illustrated). A rotary driving force may be transmitted from the rotationally driven motor shaft to a gear mechanism (not illustrated).

The gear mechanism that has received the rotary driving force from the motor shaft may provide a rotational output to an output unit 133. The output unit 133 may be appropriately provided with, for example, a bit (not illustrated) that is attached thereto. Because of this, an attachment chuck 135 for attaching the bit may be provided in the output unit 133. Furthermore, a cooling fan 137 may be attached to the motor shaft of the brushless DC motor 131. Outside air may be taken to cool the brushless DC motor 131 by the cooling fan rotating together with the motor shaft. The housing 121 may have a grip shape and form an outer shell of the grip portion 14. In other words, the grip portion 14 may be formed in a grip shape suitable for being held by a user's hand. An operation switch 15 may be provided on an upper side of the grip portion 14.

The operation switch 15 may generally include a switch main body 151 and an operation trigger 153. The switch main body 151 may be accommodated in the housing 121 which forms the grip portion 14 and send an input signal to a controller (not illustrated) upon reception of an ON input signal from the operation trigger 153. The operation trigger 153 may be exposed outside the housing 121, and is configured to be capable of performing a push-in operation, which corresponds to an ON input made by the user. A switch lever 155 may be provided on an upper side of the operation trigger 153. The switch lever 155 may switch a direction of rotation of the output unit 133. The housing 121 may be fixedly assembled by screw members 123.

The battery attachment portion 20 may be provided on a lower part of the housing 121. The slide-type battery pack 50, which will be described later, may be detachably attached to the battery attachment portion 20. The battery pack 50 may be attached to the battery attachment portion 20 by being slid relatively with respect to the battery attachment portion 20 from the front to the rear. In contrast, the battery pack 50 may be detached from the battery attachment portion 20 by being slid relatively with respect to the battery attachment portion 20 from the rear to the front.

The battery attachment portion 20 and the battery pack 50 may be provided with a rail structure 21 and a female and male connecting structure 30 which allow attachment with each other by a slide movement. The rail structure 21 may have a guiding structure for sliding the battery pack 50 with respect to the battery attachment portion 20. The female and male connecting structure 30 may be provided between the battery pack 50 and the tool main body 11 and configured to electrically connect the battery pack 50 with respect to the battery attachment portion 20 by a slide movement.

Female rails 23, which correspond to a female-type rail structure 21 as illustrated in FIG. 3, may be provided on the battery attachment portion 20. Furthermore, male rails 25, which correspond to a male-type rail structure 21 as illustrated in FIG. 1, may be provided on the battery pack 50. Specifically, the female rails 23 may be provided with a pair of left and right inward projecting portions 24 projecting from peripheral edge portions on both left and right sides of the lower part of the housing 121. The inward projecting portions 24 may extend in a sliding direction of the battery pack 50. The male rails 25 may be fitted to the female rails 23 by a slide movement. Accordingly, a relative slide movement of the battery pack 50 with respect to the battery attachment portion 20 may be performed. The battery attachment portion 20 may be provided with a female hook portion 27 with which a male hook portion 57 of the battery pack 50 can be engaged. The female hook portion 27 may include a stopper surface 271 with which a stopper portion 572 of the male hook portion 57 comes into contact when the male hook portion 57 is engaged with the female hook portion 27.

The battery pack 50 may generally include a case 51, a male hook mechanism 55, and a battery main body 61. As illustrated in FIG. 1, the case 51 may be formed by combining a lower case 52 with an upper case 53. The lower case 52 may be configured to have a box-like shape with an opening on top for accommodating the battery main body 61. In contrast, the upper case 53 may be configured to have a lid shape that can close the opening on top of the lower case 52. The lower case 52 and the upper case 53 may be integrated together by screw members 60 to form the case 51. The case 51 thus formed may include the male hook mechanism 55 and the battery main body 61 as illustrated in FIG. 3.

As illustrated in FIG. 1, the upper case 53 may be provided with the male rails 25. The male rails 25 may be provided with left and right outward projecting portions 26 in pair from peripheral edge portions on both left and right sides of an upper part of the upper case 53. The male rails 25 extending in a sliding direction may be configured to be fitted to the female rails 23 of the battery attachment portion 20 described above by a slide movement. In other words, the male rails 25 of the battery pack 50 may be fitted to the female rails 23 of the battery attachment portion 20 by the slide movement. Furthermore, the slide movement may be performed for attaching and/or detaching the battery pack 50 to and/or from the battery attachment portion 20.

As illustrated in FIG. 1 and FIG. 3, the upper case 53 may be provided with three opening slits 541 for ground terminals 65, discharging terminals 66, a charging terminal 67, and a communication terminal 68. The ground terminals 65 and the discharging terminals 66 may be power source terminals that are respectively connected to a ground male terminal 341 and a discharging male terminal 342 of the tool main body 11. In other words, the ground terminals 65 and the discharging terminals 66 in the battery pack 50 may provide electric power from the battery pack 50 to the tool main body 11. In contrast, the communication terminal 68 may be a signal terminal that is connected to a communication male terminal (male terminal 49) of the tool main body 11. The communication terminal 68 on the battery pack 50 may send and/or receive a signal between the battery pack 50 and the tool main body 11. The communication terminal 68 may be a signal terminal, and therefore, the voltage applied to the communication terminal 68 may be as low as a signal level. For comparison, for example, a voltage of 3.3 V, which is substantially lower than 5V, may be applied to the communication terminal 68 for sending and receiving the signal.

Furthermore, the upper case 53 may be provided with a connector opening 542 for a communication connector 69 of the battery pack 50. Furthermore, the upper case 53 may also be provided with a hook opening 545 configured to allow the male hook portion 57 of the battery pack 50 to project upward therethrough and a lever opening 546 configured to expose a press-down lever portion 58 of the battery pack 50 to the outside for allowing an operation thereof. The communication connector 69 may be connected to a connector connection portion of the dedicated charger, which will be described later.

The male hook mechanism 55 may be a lock mechanism configured to fix a relative positional relationship between the battery attachment portion 20 and the battery pack 50 when the battery pack 50 is attached to the battery attachment portion 20 by a slide movement. As illustrated in FIG. 5 and FIG. 6, the male hook mechanism 55 may include a male hook member 56 and a biasing spring 59. The male hook member 56 may be moved upward and downward while being supported by the case 51. The male hook portion 57 may be provided on an upper part of the male hook member 56, and the press-down lever portion 58 may be provided on a rear portion of the male hook member 56.

The male hook portion 57 may have a hook shape projecting upward from the hook opening 545 of the upper case 53. The press-down lever portion 58 may have a press-down lever shape operably exposed to the outside from the lever opening 546 of the upper case 53. The biasing spring 59 may be a coil spring configured to bias the male hook member 56 to the upper side, and the press-down lever portion 58 may be pressed downward against the biasing spring 59.

The male hook portion 57 may include a tapered portion 571 provided on a rear surface and the stopper portion 572 provided on a front surface. The tapered portion 571 may have a planar shape inclining upward from a rear side to a front side. When the battery pack 50 is attached to the battery attachment portion 20 by the slide movement, the tapered portion 571 may come into contact with a front end edge 273 of the battery attachment portion 20. Furthermore, when the battery pack 50 is slid in an attaching direction with respect to the battery attachment portion 20, the male hook member 56 including the tapered portion 571 may be pressed downward against the biasing force of the biasing spring 59. In other words, an apex 575 of the male hook portion 57 may be pressed downward. When the apex 575 of the male hook portion 57 climbs over the front end edge 273 of the battery attachment portion 20, the male hook portion 57 of the battery pack 50 may be fit in the female hook portion 27 of the battery attachment portion 20 due to the biasing force of the biasing spring 59. At that time, the sliding of the battery pack 50 with respect to the battery attachment portion 20 may be completed, and attachment of the battery pack 50 may be completed. In other words, the male hook portion 57 and the female hook portion 27 may have an engaging structure provided between the battery pack 50 and the tool main body 11, and a state of the engagement by the engagement structure may correspond to a state in which the slide movement between the battery pack 50 and the tool main body 11 is completed.

As illustrated in FIG. 6, the stopper portion 572 of the male hook portion 57 fit in the female hook portion 27 may face the stopper surface 271 of the female hook portion 27. Furthermore, a direction in which the stopper portion 572 faces the stopper surface 271 may correspond to a direction in which the battery pack 50 is removed from the battery attachment portion 20. Because of this, a movement of the battery pack 50 in a detaching direction (forward direction) with respect to the battery attachment portion 20 may be restricted by contact of the stopper portion 572 with respect to the stopper surface 271, and a relative positional relationship between the battery pack 50 and the battery attachment portion 20 may be fixed (locked state).

On the other hand, when the male hook member 56 is pressed downward by the press-down lever portion 58 against the biasing force of the biasing spring 59, the male hook portion 57 may be released from the female hook portion 27 of the battery attachment portion 20. In other words, restriction of movement of the battery pack 50 with respect to the battery attachment portion 20 may be released, and thus the battery pack 50 can be removed from the battery attachment portion 20 by being slid in the detaching direction.

The battery main body 61 may generally include a battery portion 62 and a control unit 63. The battery portion 62 may include battery cells (reference numeral is omitted) and a holder (reference numeral is omitted) for holding these battery cells. Lead plates, which are not illustrated, may be attached to electrodes of the battery cells. The lead plates may be electrically connected to a circuit board 64 of the control unit 63. The control unit 63 may include the circuit board 64 for performing various control processes. The circuit board 64 may be provided with a microcomputer, which is not illustrated. The microcomputer may monitor a state of the battery cells and control charging and discharging of the battery cells. It may possible that such a circuit board 64 may not include the microcomputer but include a similar electric components for controlling charging and discharging of the battery cells.

The ground terminals 65, the discharging terminals 66, the charging terminal 67, the communication terminal 68, and the communication connector 69 described above may be mounted on the upper surface of the circuit board 64. The ground terminals 65 may be connected to negative terminals of the tool main body 11 or a dedicated charger 90. The discharging terminals 66 may be connected to positive terminals of the tool main body 11 or a dedicated charger 90. The charging terminal 67 may be connected to a charging terminal of the dedicated charger 90. The communication terminal 68 may be connected to a communication terminal of the tool main body 11. The communication connector 69 may be connected to a communication connector of the dedicated charger 90. Signals may be transmitted and/or received via the communication terminal 68 and the communication connector 69 based on a control process of the circuit board 64.

The ground terminals 65 and the discharging terminals 66 may correspond to female terminals according to the present embodiment. The ground terminals 65 and the discharging terminals 66 may be located between the above-described male rails 25. Both of the ground terminals 65 and the discharging terminals 66 may be configured to have a female shape along the sliding direction. Both of the ground terminals 65 and the discharging terminals 66 may be positioned symmetrically with respect to a center axis X of the battery pack 50 along the sliding direction. As described later, the ground terminals 65 and the discharging terminals 66 may be electrically connected to the male terminals 34 provided on the battery attachment portion 20 by sliding the battery pack 50 relatively with respect to the tool main body 11.

Figure 7:
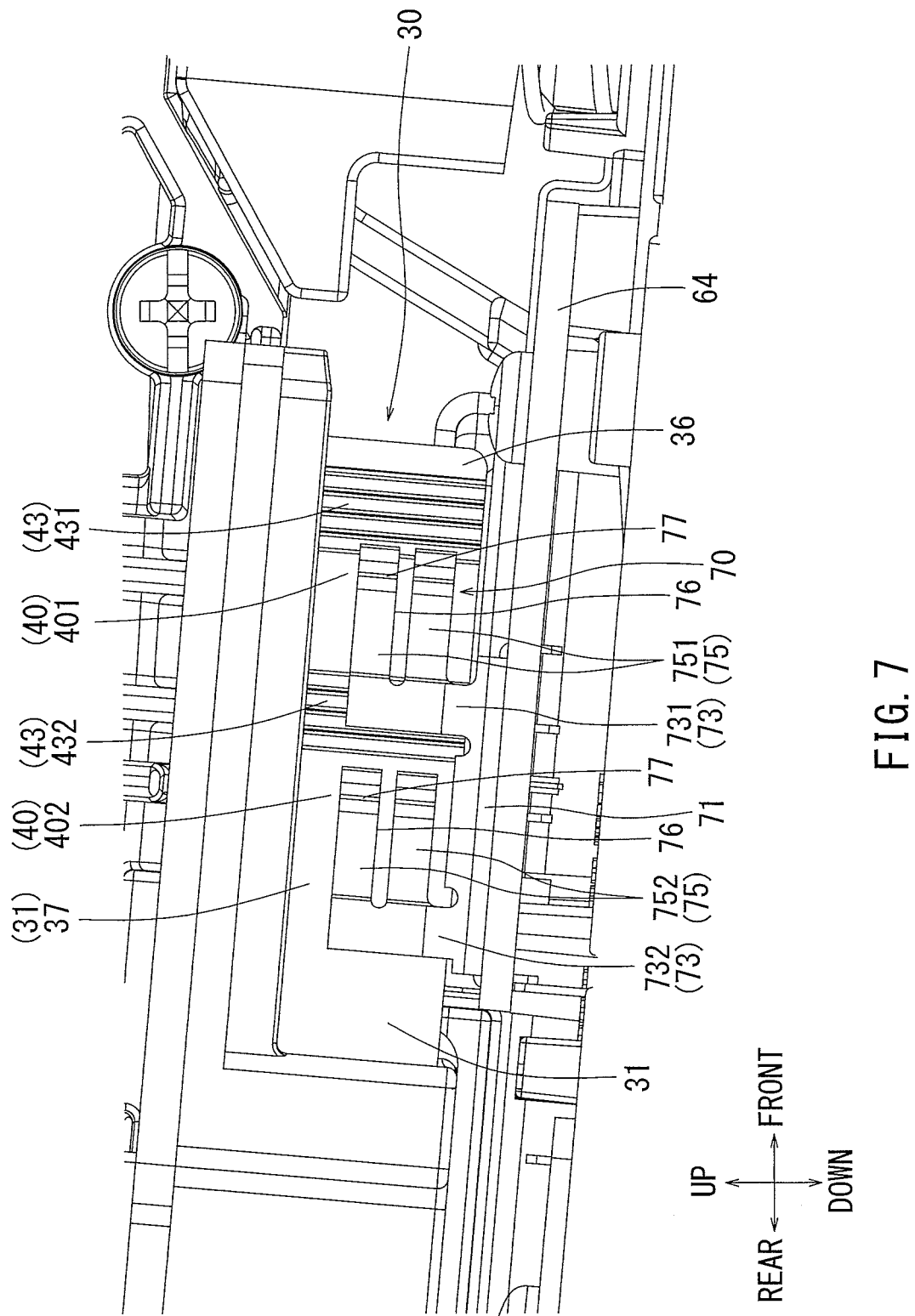
FIG. 7 is an enlarged side view illustrating an insertion portion in FIG. 6 in an enlarged scale.

The ground terminals 65 and the discharging terminals 66 may be formed by mounting the same female terminals 70 on the circuit board 64. The female terminals 70 may have the female shape and may be electrically connected with the male terminals 34 of the battery pack 50. The female terminals 70 may be formed in the female shape such that the plate-shaped male terminals 34, which will be described later, can be inserted to the female terminals and/or sandwiched from both sides of the female terminals 70. In other words, the female terminals 70 may be configured to form a pair in a symmetrical structure. Because of this construction, only one of the pair will be described in the following description. An enlarged side view in FIG. 7 illustrates in an enlarged scale an insertion portion (the male terminal 34 and the female terminal 70) shown in FIG. 6.

The female terminal 70 may be formed such that there are two electrical contact points separated in the longitudinal direction (front-rear direction), i.e. a front contact point and a rear contact point. As illustrated in FIG. 7, the female terminal 70 may include a supporting seat 71, supporting bridges 73, and terminal portions 75, which are integrally formed. The supporting seat 71 may be configured to be a seat that can be mounted on the circuit board 64. The supporting seat 71 may have an elongated plate shape extending in a front-rear direction. The supporting bridges 73 may be provided so as to protrude upward from peripheral edges of the supporting seat 71 on both left and right sides. The supporting bridges 73 may include a front bridge portion 731 and a rear bridge portion 732, which may be provided separately from the supporting seat 71. Furthermore, the terminal portions 75 may be provided on upper parts of the front bridge portion 731 and the rear bridge portion 732. The front bridge portion 731 and the rear bridge portion 732 may be supported by the supporting seat 71 located on a lower side, and may support the terminal portions 75 located on an upper side. The front bridge portion 731 and the rear bridge portion 732 may have the same shape.

Front terminal portions 751 may be provided on an upper part of the front bridge portion 731. Furthermore, rear terminal portions 752 may be provided on an upper part of the rear bridge portion 732. The front terminal portions 751 and the rear terminal portions 752 may be formed to have the same shape. In other words, each of the front terminal portions 751 and the rear terminal portions 752 may be configured to form a pair in a symmetrical structure. Because of this construction, each of the front terminal portions 751 and the rear terminal portions 752 may come into contact with the male terminal 34 by sandwiching and/or pinching the male terminal 34. The terminal portions 75 (the front terminal portions 751 and the rear terminal portions 752) may be formed such that the elastically deformable leaf spring may extend forward from the supporting bridge 73. In more detail, the terminal portions 75 (the front terminal portions 751 and the rear terminal portions 752) may be formed so as to incline inward toward each other from the left and the right as the terminal portions extend forward. In other words, the terminal portions 75 may be formed such that the distance therebetween is reduced as the terminal portions 75 extend forward until both terminals come into contact with each other in the vicinity of the front ends thereof.

The terminal portions 75 may be formed in a leaf spring shape projecting toward the front side having a spring property for sandwiching and/or pinching the male terminal 34. In other words, the left and right terminal portions 75 forming a pair may have adequate elasticity for sandwiching and/or pinching the male terminal 34. In this manner, the female terminals 70 may be configured to have a pinching type which allows insertion of the male terminals 34 to the female terminals 70 in the sliding direction and coming into elastically contact with the male terminal 34. Furthermore, as illustrated in FIG. 7, each of the front terminal portions 751 and the rear terminal portions 752 may be divided into an upper part and a lower part to come into contact with the male terminals 34 at contact points 77. Furthermore, as illustrated in FIG. 7, each of the front terminal portions 751 and the rear terminal portions 752 may be provided with a slit 76 extending in the front-rear direction to divide into the upper and lower parts. In this manner, the male terminals 34 may come into contact with the female terminals 70 at four contact points 77 in total (power may be supplied via the four contact points 77).

Figure 9:
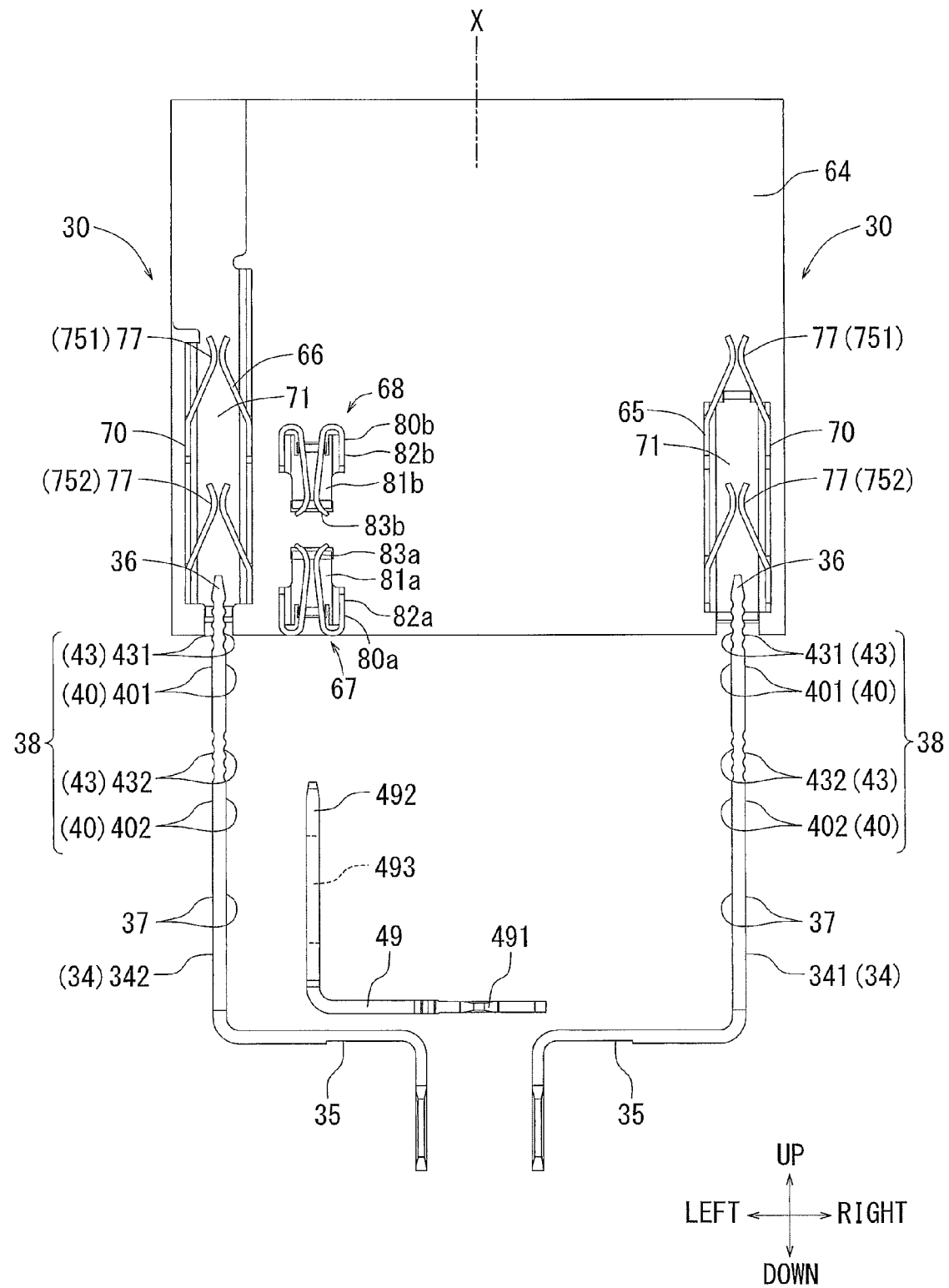
FIG. 9 is a plan view illustrating an initial stage of a slide insertion of a male terminal to a female terminal.

The ground terminals 65 and the discharging terminals 66 may be configured to be the female terminals 70, and the charging terminal 67 may be configured to be a female terminal 80a and the communication terminal 68 may be configured to be a female terminal 80b. The charging terminal 67 configured to be the female terminal 80a may be electrically connected to a male terminal 49B (see FIG. 24) of the dedicated charger 90, which will be described later. Furthermore, the communication terminal 68 configured to be the female terminal 80b may be electrically connected to a male terminal 49 of the battery attachment portion 20. The charging terminal 67 and the communication terminal 68 configured to be the female terminals 80a and 80b respectively may have the same shape facing with each other. As illustrated in FIG. 9, the female terminals 80a and 80b may also include supporting seats 81a and 81b, supporting bridges 82a and 82b, and terminal portions 83a and 83b. That is, the female terminals 80a and 80b may be formed in a type of the female terminal that includes contact points with respect to the male terminal sandwiched and/or pinched therebetween.

Figure 8:
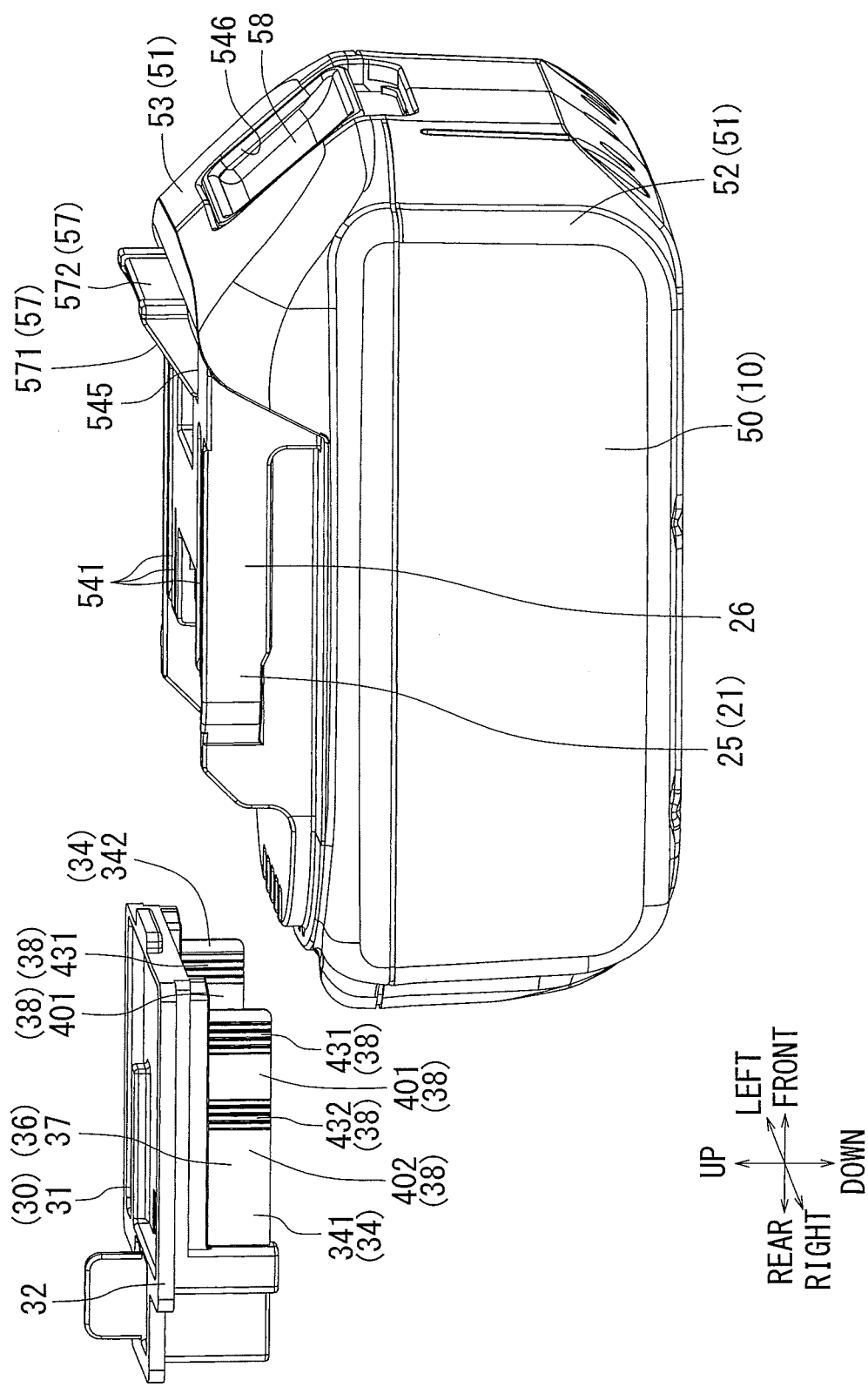
FIG. 8 is a perspective view showing a male terminal member and the battery pack.

Next, the male terminals 34 provided on the battery attachment portion 20 will be described. The male terminals 34 may be electrically connected to the female terminals 70 by being inserted into the female terminals 70 described above. As illustrated in FIG. 8, the male terminals 34 may be configured to be a part of a male terminal member 31. FIG. 8 shows a perspective view of the male terminal member 31 and the battery pack 50. As illustrated in FIG. 8, the male terminal member 31 may be a member that becomes a part of the battery attachment portion 20 by being attached to the tool main body 11. The male terminal member 31 may include a base 32 and the male terminals 34. The base 32 may be a substantially flat plate-shaped member formed of resin. The base 32 may be provided with required structure to be the part of the battery attachment portion 20. The base 32 may be provided with two male terminals 34 on a lower surface thereof extending along the front-rear direction, which corresponds to the sliding direction.

Figure 10:
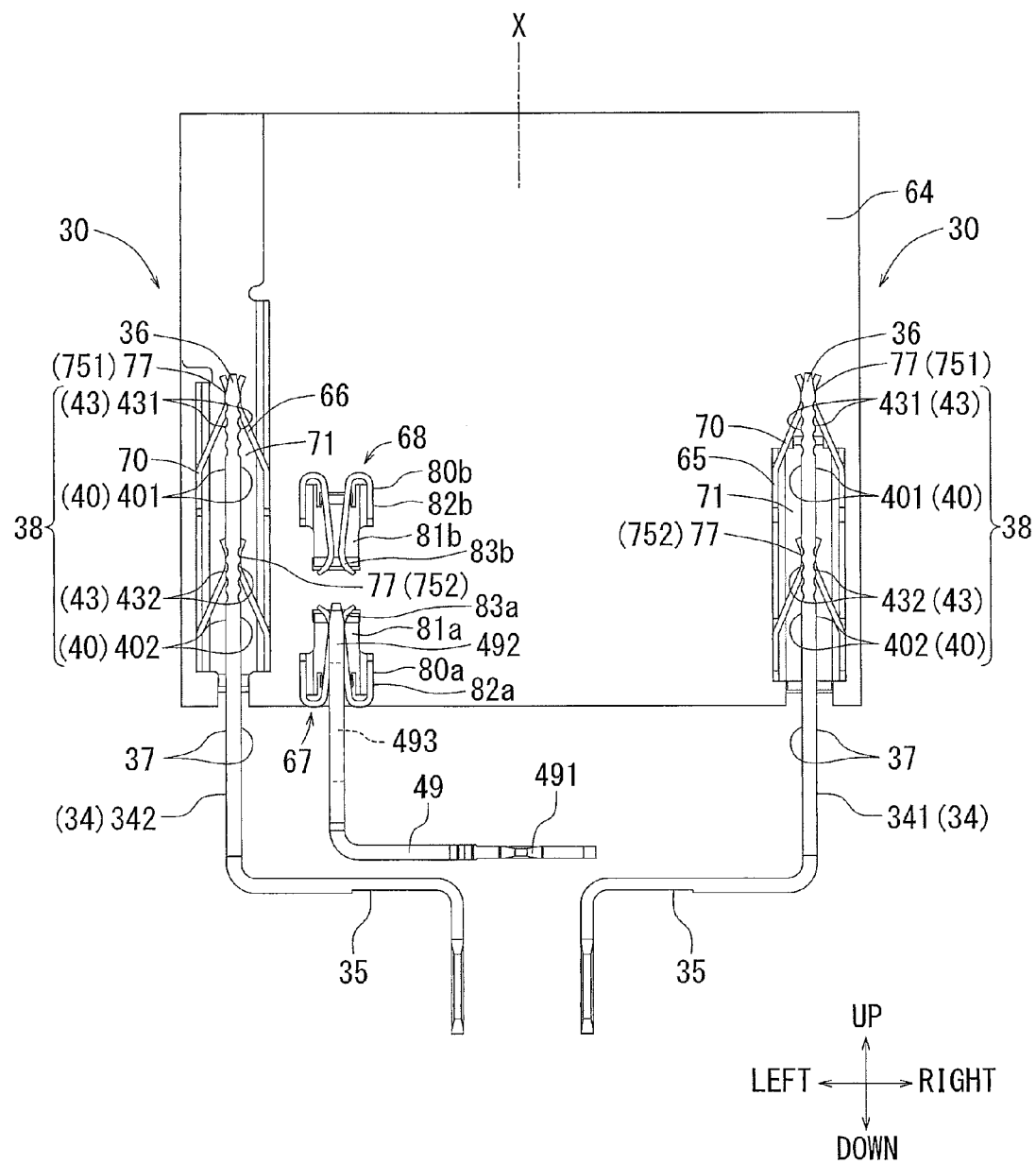
FIG. 10 is a plan view illustrating a middle stage of a slide insertion of the male terminal to the female terminal.
Figure 11:
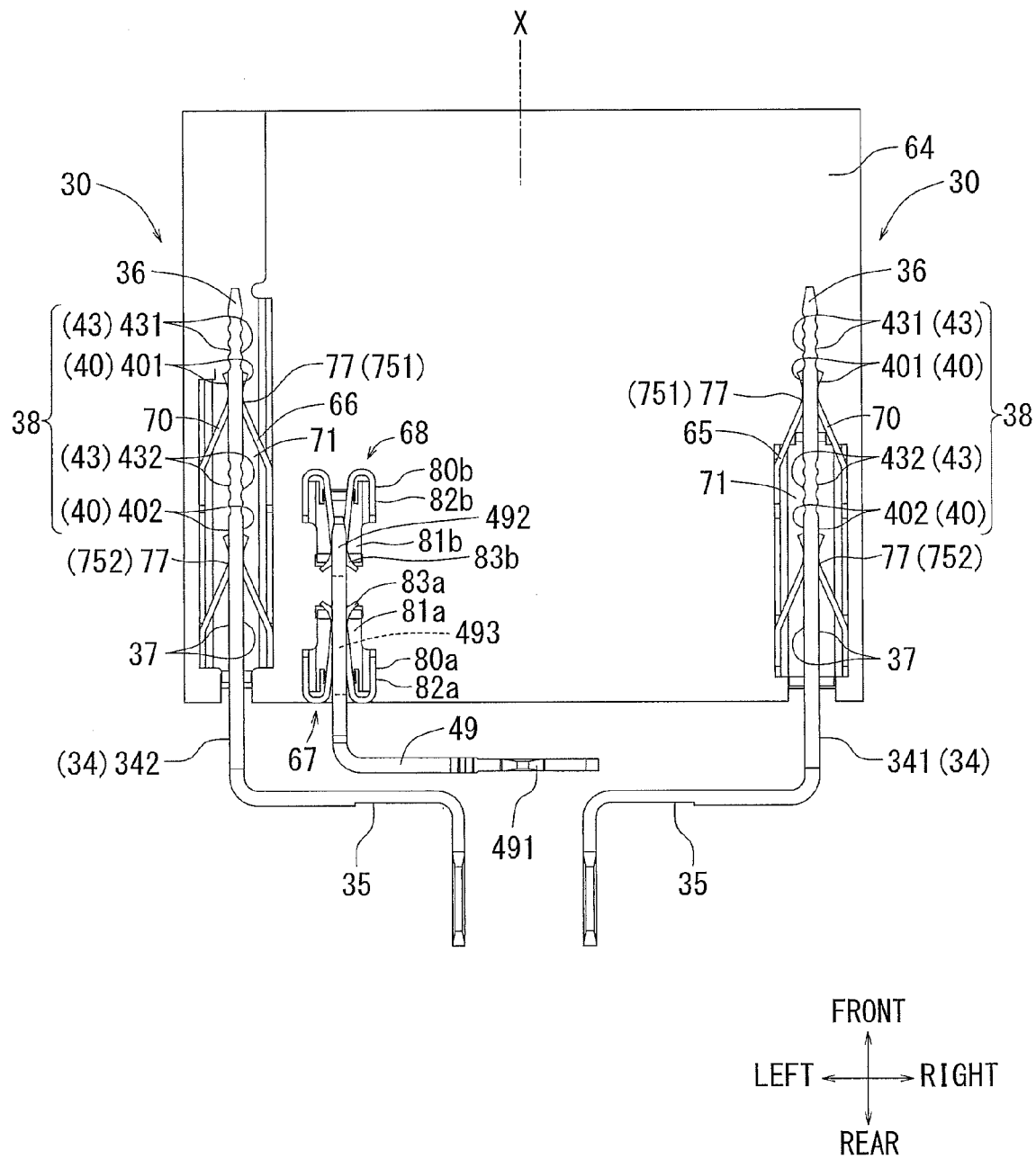
FIG. 11 is a plan view illustrating a completion stage of a slide insertion of the male terminal to the female terminal.

Detailed explanation about insertion of the male terminals 34 into the female terminals 70 will be described with reference to FIGS. 9 to 11. FIG. 9 is a plan view illustrating an initial stage of a slide insertion of the male terminals 34, FIG. 10 is a plan view illustrating a middle stage of the slide insertion of the male terminal 34, and FIG. 11 is a plan view illustrating a completion stage of the slide insertion of the male terminal 34. In FIGS. 9 to 11, members other than the male terminals 34, the male terminal 49, the female terminals 70, the female terminals 80a and 80b, and the circuit board 64 are not shown in order to easily understand the insertion of the male terminals 34 into the female terminals 70. In FIGS. 9 to 11, the male terminal 34 arranged on the right side may correspond to the ground male terminal 341 to be connected to the ground terminals 65. Furthermore, the male terminal 34 arranged on the left side may correspond to the discharging male terminal 342 to be connected to the discharging terminals 66. The female and male connecting structures 30 may be provided in pair corresponding to positive and negative terminals of a power source. As illustrated in FIGS. 9 to 11, the ground male terminal 341 and the discharging male terminal 342 may be configured to have a shape of symmetry with respect to the center axis X, and the battery attachment portion 20 may be located at positions of symmetry with respect to the center axis X.

Figure 12:
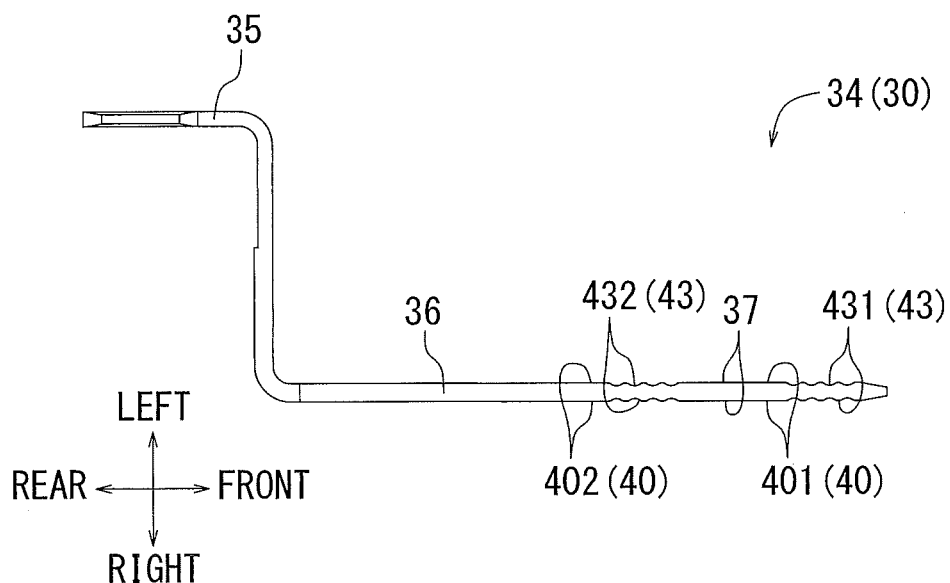
FIG. 12 is an enlarged top view illustrating the male terminal.
Figure 13:
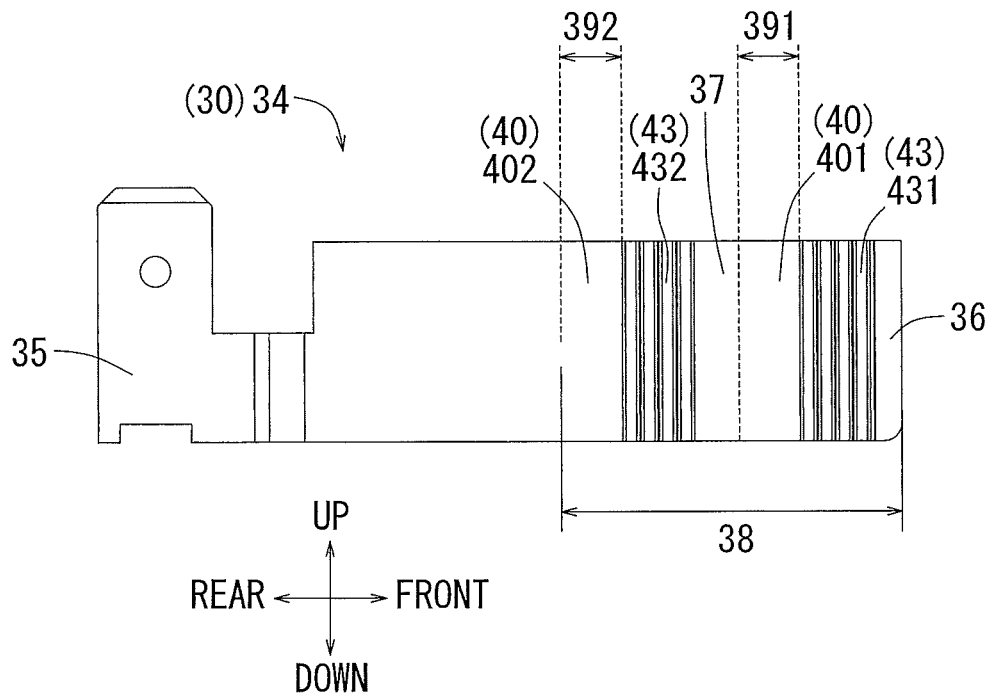
FIG. 13 is an enlarged side view illustrating the male terminal.
Figure 14:
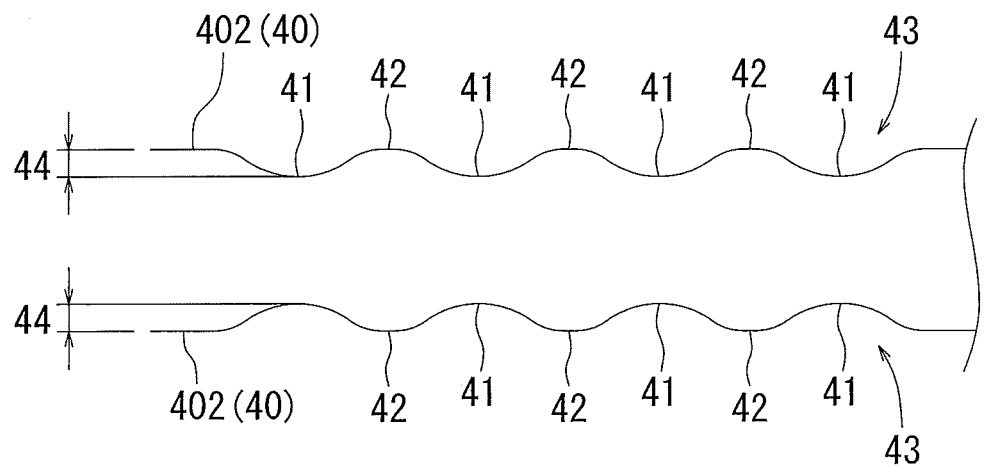
FIG. 14 is an enlarged top view illustrating a concavo-convex portion illustrated in FIG. 12 in a further enlarged scale.

FIGS. 12 to 14 show the male terminals 34 in detail. FIG. 12 is an enlarged top view illustrating the male terminal 34 that is the ground male terminal 341. FIG. 13 is an enlarged side view illustrating the male terminal 34 that is the ground male terminal 341. FIG. 14 is an enlarged top view illustrating a concavo-convex portion 43 shown in FIG. 12 in a further enlarged scale. The male terminals 34 may be formed of an elongated plate having enough rigidity to be inserted into the female terminals 70, and as shown in FIG. 12, a part of the male terminals 34 may be bent as needed. As illustrated in FIG. 13, the male terminals 34 may be functionally divided into a mounting portion 35 and a terminal portion 36. Furthermore, as illustrated in FIG. 8, the mounting portions 35 may be mounted on the base 32 described above. The mounting portions 35 may be electrically connected to the controller mounted in the tool main body 11. Furthermore, the terminal portions 36 may be inserted into the female terminals 70. The terminal portions 36 may be formed in an elongated plate shape extending in the front-rear direction, which corresponds to the sliding direction.

Side surfaces 37 on both sides of the terminal portions 36 may extend in the front-rear direction, which corresponds to the sliding direction. The side surfaces 37 on both sides may have an area with which the contact point 77 of the female terminal 70 comes into sliding contact when sliding the battery pack 50. An area of the side surfaces 37 with which the contact point 77 of the female terminal 70 comes into sliding contact may be configured to be a sliding surface 38. Naturally, the sliding surfaces 38 may extend in the sliding direction. As illustrated in FIG. 13, the sliding surfaces 38 may include two planar connecting portions 40. When slide movement is finished and the insertion of the male terminals 34 into the female terminals 70 is completed, the planar connecting portions 40 may come into contact with the contact points 77 of the female terminals 70. The planar connecting portions 40 may be formed in a planer shape extending flat in the sliding direction. The planar connecting portions 40 may be portions with which the contact points 77 of the female terminals 70 come into contact when the slide movement is completed, whereby mutual electric connection between the female terminals 70 and the male terminals 34 may be obtained. The completion of the slide movement may be a state in which the male hook portion 57 climbs over the rear end edge 273 of the battery attachment portion 20 and is fit to the female hook portion 27.

The contact points 77 of the female terminals 70 described above may be provided on the front terminal portions 751 and the rear terminal portions 752. Corresponding to this, the planar connecting portions 40 with which the contact points 77 of the female terminals 70 come into contact may be provided in two areas that are offset in the front-rear direction. More specifically, as illustrated in FIG. 13, a smooth surface area 391 on the front side of the sliding surface 38 may be configured to be a front plane connecting portion 401, and a smooth surface area 392 on the rear side of the sliding surface 38 may be configured to be a rear plane connecting portion 402. The front plane connecting portion 401 may come into contact with the contact points 77 of the front terminal portions 751, and the rear plane connecting portion 402 may come into contact with the contact points 77 of the rear terminal portions 752. The front plane connecting portion 401 and the rear plane connecting portion 402 may be a smooth plane extending in the sliding direction. Furthermore, the contact points 77 of upper parts and lower parts of the front terminal portions 751 of the female terminals 70 may elastically pinch and/or sandwich and come into contact with the front plane connecting portions 401 to be electrically connected to the front plane connecting portion 401 of the male terminal 34. Similarly, the contact points 77 of the upper parts and the lower parts of the rear terminal portions 752 of the female terminals 70 may elastically pinch and/or sandwich and come into contact with the rear plane connecting portion 402 to be electrically connected to the rear plane connecting portion 402.

The sliding surfaces 38 may include concavo-convex portions 43 in two areas. More specifically, front concavo-convex portions 431 may be provided on the front side of the front plane connecting portion 401, and rear concavo-convex portions 432 may be provided on the front side of the rear plane connecting portion 402. The front concavo-convex portions 431 and the rear concavo-convex portions 432 may be located offset on the sliding surfaces 38 in the front-rear direction, and also may have the same configuration. As illustrated in, for example, FIG. 9, FIG. 13, and FIG. 14, the concavo-convex portions 43 (the front concavo-convex portions 431 and the rear concavo-convex portions 432) may include a plurality of concave portions 41 extending in a vertical direction and being arranged in the front-rear direction. The concave portions 41 may correspond to level difference portions of the present embodiment. The concave portions 41 may have a concaved and/or recessed shape formed by recessing the terminal portions 36 in a thickness direction of the plate, i.e. the male terminal 34, to form a level difference 44 with respect to the planar connecting portions 40.

As illustrated in FIGS. 13 and 14, the plurality of the concave portions 41, for example four concave portions, may be arranged in parallel in the front-rear direction on the sliding surface 38. Because of this construction, the concavo-convex portions 43 may include four concave portions 41 extending in the vertical direction, and three protrusions extending in the vertical direction that are located between the four concave portions 41. The concave portions 41 that form the level difference 44 in this manner may be provided on the sliding surface 38 as linear ridges extending in the direction intersecting with the sliding direction. As illustrated in FIG. 13, the front plane connecting portions 401 and the rear plane connecting portions 402 may be provided at a distance in the sliding direction. In other words, the front concavo-convex portion 431 and the rear concavo-convex portion 432 may be arranged at a distance in the sliding direction. In this example, two concavo-convex portions may be arranged in the sliding direction.

The front concavo-convex portion 431 and the rear concavo-convex portion 432 may be provided on both of the ground male terminal 341 and the discharging male terminal 342 at the same positions in the sliding direction, respectively. Because of this construction, when sliding contact of the ground male terminal 341 and the discharging male terminal 342 is performed with respect to the contact points 77 of the female terminals 70 (the ground terminals 65 and the discharging terminals 66), equivalent loads may be simultaneously applied to both the left and right connecting structure 30. In other words, sliding contacts of the ground male terminal 341 and the discharging male terminal 342 with respect to the front plane connecting portions 401 and the rear plane connecting portions 402 may be performed simultaneously during the slide movement of the battery pack 50.

As illustrated, for example, in FIG. 11, the male terminal 49 formed in a type of the male terminal may be inserted into the female terminal 80*b*. The male terminal 49 may correspond to a signal terminal of the present embodiment. The male terminal 49 may include a mounting portion 491 and a terminal portion 492 in the same manner as the male terminals 34. Furthermore, the male terminal 49 may be configured not to be connected to the female terminal 80*a* of the charging terminal 67, and to be connected only to the female terminal 80*b* of the communication terminal 68. More specifically, the male terminal 49 may be provided with a cut-out portion 493 that is made by partly cutting the plate. The cut-out portion 493 may be configured such that when insertion of the male terminal 49 into the female terminal 80*a* is completed, the male terminal 49 may not come into contact with the female terminal 80*a* due to the cut-out portion 493. The length of the male terminal 49 in the front-rear direction may be configured to be shorter than the terminal portions 36 of the male terminals 34. Furthermore, the male terminal 49 may not be provided with the concavo-convex portions 43.

In the female and male connecting structure 30 provided between the battery pack 50 and the tool main body 11 configured as described above, the following advantageous effects may be obtained. In the female and male connecting structure 30 provided between the battery pack 50 and the tool main body 11 as described above, the level difference 44 may be formed in the thickness direction of the plate, i.e. the male terminal 34, owing to the concave portions 41 on the sliding surface 38 of the terminal portions 36 of the male terminals 34. Furthermore, the concavo-convex portions 43 may be formed at a plurality of positions. The sliding surfaces 38 may be the area with which the contact points 77 of the female terminals 70 comes into contact during the slide movement. Because of this construction, oxidized films formed on the surfaces of the terminal portions 75 (especially the contact points 77) of the female terminals 70 can be removed and/or scraped by the concavo-convex portions 43 during the slide movement. Accordingly, in the female and male connecting structure 30 described above, the oxidized films formed on the surfaces of the terminal portions 75 can be removed without increasing a burden on the user for managing the tool, so that electrical connection between the female terminals 70 and the terminal portions 36 of the male terminals 34 can be maintained desirably and/or satisfactorily over a long period.

Furthermore, according to the female and male connecting structure 30 provided between the battery pack 50 and the tool main body 11 as described above, since the female and male connecting structure 30 is provided between the battery pack 50 and the tool main body 11, the oxidized films formed on the surfaces of the terminal portions 75 can be removed without increasing a burden on the user for managing the impact driver 10, so that electrical connection between the female terminals 70 and the terminal portions 36 of the male terminals 34 can be maintained desirably and/or satisfactorily over a long period. Furthermore, according to the female and male connecting structure 30 provided between the battery pack 50 and the tool main body 11 described above, when the slide movement is finished, the planar connecting portions 40 may come into contact with the female terminals 70 and electrical contact may be made, which means that the level difference 44 may not be provided on the area where the female terminals 70 and the terminal portions 36 of the male terminals 34 come into contact with each other. Accordingly, the electric contact between the female terminals 70 and the terminal portions 36 of the male terminals 34 may be desirably and/or satisfactorily obtained.

According to the female and male connecting structure 30 provided between the battery pack 50 and the tool main body 11 described above, the concave portions 41 that are concaved with respect to the planar connecting portions 40 in the thickness of the plate, i.e. the male terminal 34, may form the level difference 44. Because of this construction, the oxidized films formed on the surfaces of the terminal portions 36 can be removed and/or scraped owing to the level difference 44 during the slide movement. Furthermore, according to the female and male connecting structure 30 provided between the battery pack 50 and the tool main body 11 described above, the level difference 44 formed by the concave portions 41 may include linear ridges extending in an orthogonal direction intersecting with the sliding direction. Because of this construction, the oxidized films formed on the surface of the terminal portions 36 may be removed and/or scraped during the slide movement owing to the linear ridges extending in the intersecting direction.

According to the female and male connecting structure 30 provided between the battery pack 50 and the tool main body 11 described above, the contact points 77 of the female terminals 70 may include both the front terminal portions 751 and the rear terminal portions 752 provided at a distance in the sliding direction. Furthermore, the planar connecting portions 40 may include the front plane connecting portion 401 in the front smooth surface area 391 on the sliding surface 38 and the rear plane connecting portion 402 in the rear smooth surface area 392 on the sliding surface 38. In this way, the planar connecting portions 40 may include the front plane connecting portion 401 and the rear plane connecting portion 402 provided at a distance in the sliding direction corresponding to the two female terminals 70. Accordingly, the electric contact points of the female terminals 70 and the electric contact points of the terminal portions 36 of the male terminals 34 may be reliably obtained, and thus mutual electrical connection between the female terminals 70 and the male terminals 34 may be reliably and/or desirably achieved. The planar connection portions 40 corresponding to the contact points 77 of the female terminals 70 may be provided such that there are two areas that include the above-described concave portions 41, or such that the concave portions 41 are provided along the entire sliding surfaces 38.

Furthermore, according to the female and male connecting structure 30 provided between the battery pack 50 and the tool main body 11 described above, the female and male connecting structures 30 may be provided in pair corresponding to positive and negative terminals of the power source. Sliding contact between the concave portions 41 and the contact points 77 of the female terminals 70 in pair may be achieved simultaneously during the slide movement of the battery pack 50. Because of this construction, i.e. the arrangement of the pair, sliding resistance of the battery pack 50 when climbing over the positions of the level difference 44 may be received in a balanced manner during the slide movement of the battery pack 50. Accordingly, the sliding resistance that is generated when the battery pack 50 is slid with respect to the tool main body 11 can be received in a balanced manner by the arrangement of the pair, and thus the sliding posture of the battery pack 50 may be desirably maintained, and operability may be improved during the slide movement. Furthermore, according to the female and male connecting structure 30 provided between the battery pack 50 and the tool main body 11 described above, the oxidized films on the ground female terminal 65 and the discharging female terminal 66 may be desirably removed, while the male terminal 49 for a signal terminal may not include concavo-convex portions. Because of this construction, a useless concavo-convex portions, which may cause attaching and/or removing resistance, may be eliminated from the male terminal 49, and thus the battery pack 50 may be easily and/or desirably attached to and removed from the tool main body 11.

Second Embodiment

Next, another embodiment will be described in which the concavo-convex portion may differ from the concavo-convex portions 43 of the first embodiment described above. In the embodiments described below, only a configuration of the concavo-convex portions 43 provided on the sliding surface 38 of the terminal portions 36 may differ from that of the first embodiment. Accordingly, in the embodiments described below, descriptions about portions having the same configurations as the first embodiment will be omitted by placing the same reference numerals as those in the first embodiment. Furthermore, in the embodiments described below, portions configured to be in a different manner while functioning in the same manner as the first embodiment described above will be described by suffixing alphabet symbols to the reference numerals in the first embodiment.

Figure 15:
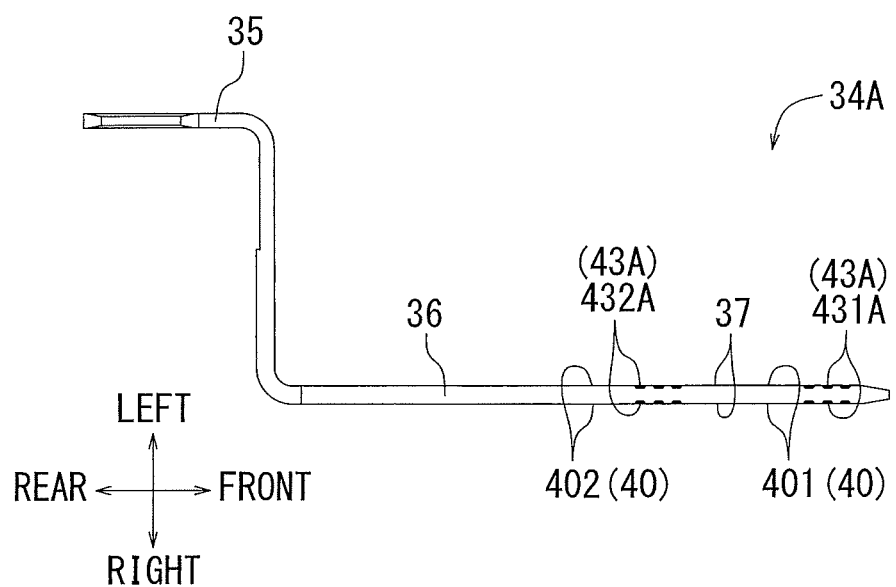
FIG. 15 is an enlarged top view illustrating a male terminal according to a second embodiment.
Figure 16:
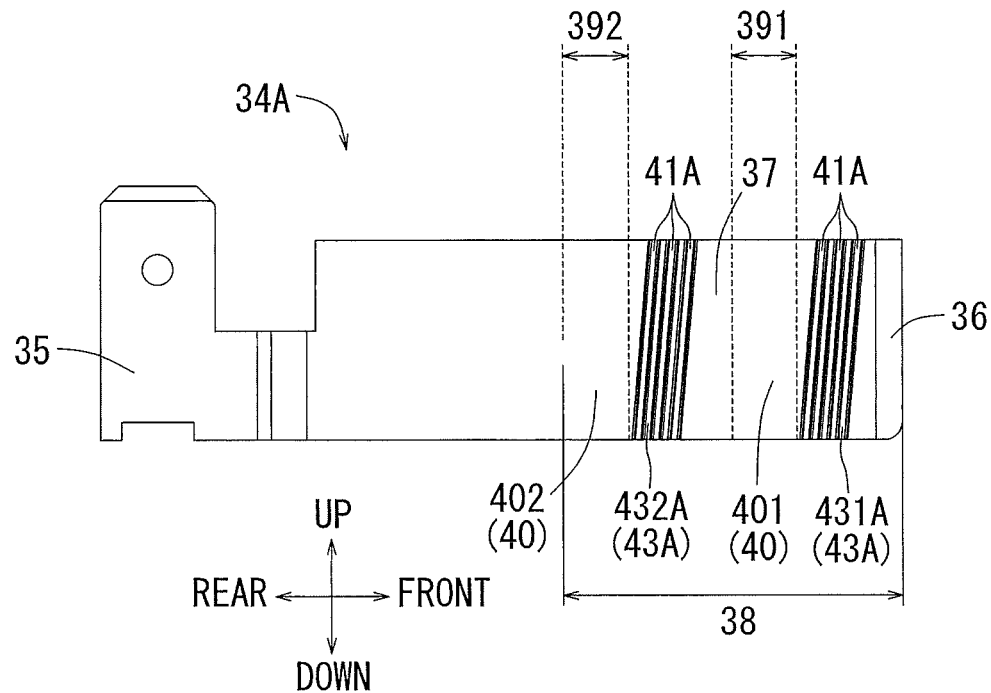
FIG. 16 is an enlarged side view illustrating the male terminal according to the second embodiment.

FIG. 15 is an enlarged top view illustrating a male terminal 34A according to a second embodiment. FIG. 16 is an enlarged top view illustrating the male terminal 34A according to the second embodiment. FIG. 15 illustrates the male terminal 34A viewed in the same manner as in FIG. 12, and FIG. 16 illustrates the male terminal 34A viewed in the same manner as in FIG. 13. Regarding the male terminal 34A of the second embodiment, the sliding surface 38 may include concavo-convex portions 43A in two areas in the same manner as the first embodiment described above. In the concavo-convex portion 43A of the second embodiment, a front concavo-convex portion 431A may be provided on the front side of the front plane connecting portion 401, and a rear concavo-convex portion 432A may be provided on the front side of the rear plane connecting portion 402 in the same manner as the first embodiment.

Regarding a configuration arranged on the sliding surface 38, the front concavo-convex portion 431A may have the same configuration as the rear concavo-convex portion 432A. As illustrated in FIG. 15 and FIG. 16, the concavo-convex portions 43A, i.e. the front concavo-convex portion 431A and the rear concavo-convex portion 432A, may include a plurality of concave portions 41A extending in the vertical direction and arranged in the front-rear direction. Furthermore, the concave portions 41A may extend so as to be obliquely inclined rearward as they extend downward. The concave portions 41A may correspond to the level difference portions of present embodiment of the invention. In the same manner as the first embodiment, the concave portions 41A may have a concaved and/or recessed shape formed by recessing the terminal portions 36 having the sliding surface 38 in a thickness direction of the plate, i.e. the male terminal 34A, to form the level difference 44. In other words, the concave portions 41A may provide the level difference 44 in a recessed shape that is concaved with respect to the planar connecting portions 40 in the thickness direction of the plate, i.e. the male terminal 34A.

The concave portions 41A of the second embodiment may differ from the concave portions 41 in the first embodiment in that those of the second embodiment are inclined in the front-rear direction. In more detail, the concave portions 41A of the second embodiment may be provided on the sliding surface 38 as linear ridges extending in the direction intersecting the sliding direction (front-rear direction in the drawing), and also extending in the direction intersecting the direction orthogonal to the sliding direction (vertical direction in the drawing). In configurations other than this, the concave portions 41A of the second embodiment may be provided as the linear ridges extending linearly in the same manner as the concave portions 41 of the first embodiment, and the area of the concave portions 41A in the second embodiment may also be provided on the sliding surface 38 in the same manner as the area of the concave portions 41 of the first embodiment. Furthermore, the front plane connecting portion 401 and the rear plane connecting portion 402 of the second embodiment may be provided as smooth surface areas 391 and 392 on the front and the rear of the sliding surface 38 in the same manner as those in the first embodiment.

In the case where the front concavo-convex portion 431A (43A) and the rear concavo-convex portion 432A (43A) are provided as in the second embodiment, the level difference portions may also intersect the direction orthogonal to the sliding direction (the vertical direction in the drawing). Accordingly, removed chips and/or powders of the oxidized films remaining in the recessed portions of the concavo-convex portion 43A can be moved along the direction intersecting the sliding direction upon the slide movement of the level difference portions extending in the intersecting direction. Because of this configuration, the removed chips and/or powders of the oxidized films may be discharged from the male and female terminals.

Third Embodiment

Figure 17:
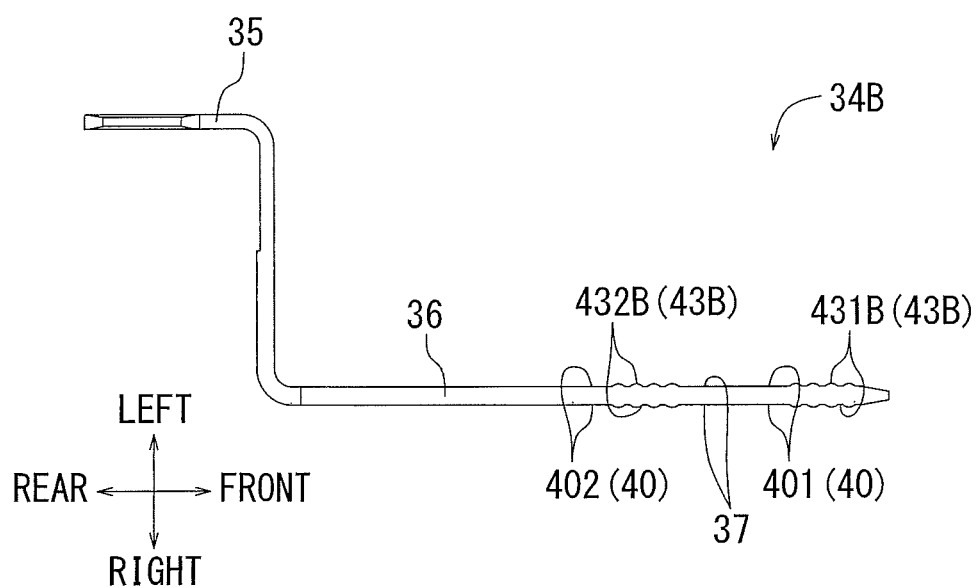
FIG. 17 is an enlarged top view illustrating a male terminal according to a third embodiment.
Figure 18:
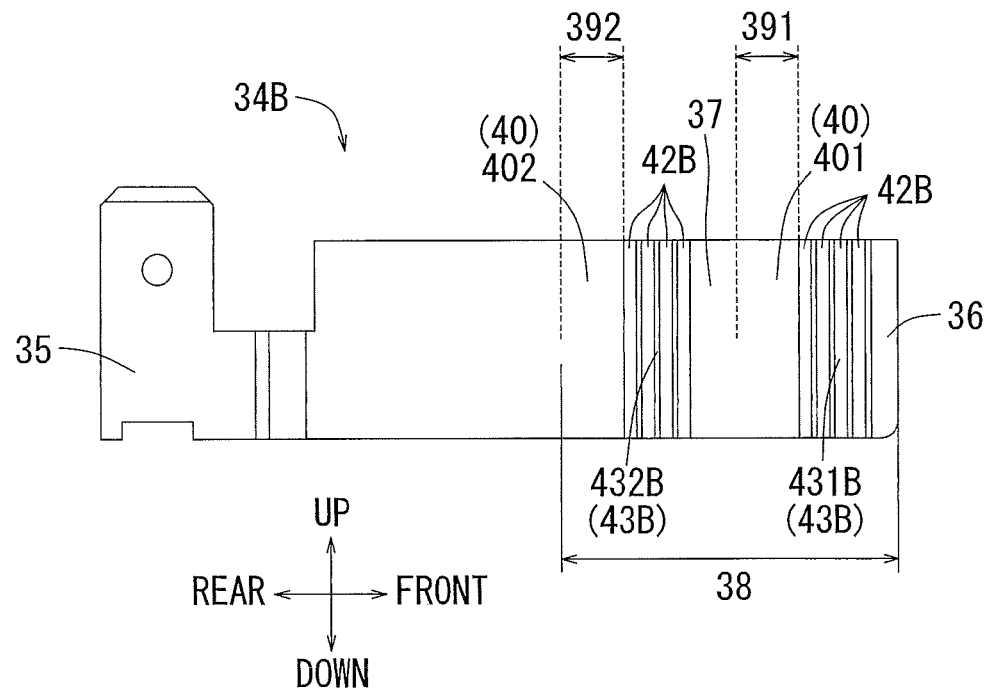
FIG. 18 is an enlarged side view illustrating the male terminal according to the third embodiment.
Figure 19:
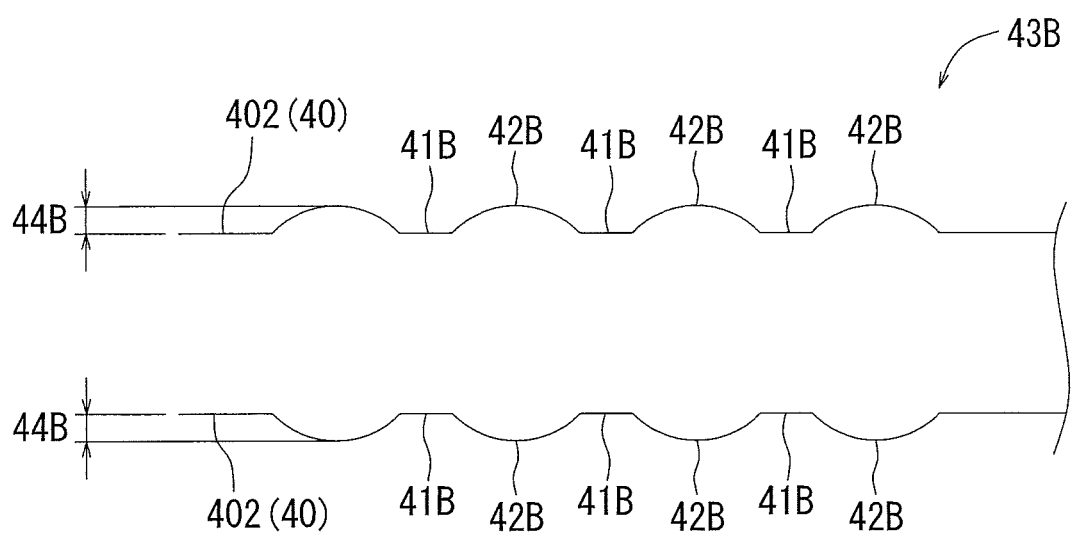
FIG. 19 is an enlarged top view illustrating a concavo-convex portion in FIG. 17 in a further enlarged scale.

The level difference portions of the present invention are not limited to the examples of the first embodiment and the second embodiment described above, and any configurations may be employed as long as the level difference portions are provided in the thickness direction of the plate, i.e. the male or female terminal. For example, the level difference portions may be produced by providing projecting portions projecting in the thickness direction of the plate, i.e. the male terminal 34B, with respect to the planar connecting portions 40. FIG. 17 is an enlarged top view illustrating a male terminal 34B according to a third embodiment. FIG. 18 is an enlarged side view illustrating a male terminal 34B according to the third embodiment. FIG. 17 illustrates the male terminal 34B viewed in the same manner as in FIG. 12, and FIG. 18 illustrates the male terminal 34B viewed in the same manner as in FIG. 13. FIG. 19 is an enlarged top view illustrating a concavo-convex portion 43B in FIG. 17 in an enlarged scale.

Regarding the male terminal 34B of the third embodiment, the sliding surface 38 may include concavo-convex portions 43B in two areas in the same manner as the first embodiment. In the concavo-convex portion 43B of the third embodiment, a front concavo-convex portion 431B may be provided on the front side of the front plane connecting portion 401, and a rear concavo-convex portion 432B may be provided on the front side of the rear plane connecting portion 402 in the same manner as the first and second embodiments described above. The front concavo-convex portion 431B and the rear concavo-convex portion 432B may be located offset on the sliding surface 38 in the front-rear direction, and also the front concavo-convex portion 431B may have the same configuration as the rear concavo-convex portion 432B. As illustrated in FIG. 18 and FIG. 19, the concavo-convex portions 43B (the front concavo-convex portion 431B and the rear concavo-convex portion 432B) may include a plurality of projection 42B extending in the vertical direction and arranged in the front-rear direction. The projections 42B may correspond to the level difference portions of the present embodiment. In other words, the projections 42B may have a projecting shape projecting from the terminal portions 36 in the thickness direction of the plate, i.e. the male terminal 34B, and a level difference 44B may be formed with respect to the planar connecting portions 40.

As illustrated in FIG. 18 and FIG. 19, a plurality of the projections 42B, for example, four projections 42B may be arranged in parallel in the front-rear direction on the sliding surface 38. In this case, the concavo-convex portions 43B may include four projections 42B extending in the vertical direction and three concave portions 41B located between the four projections 42B extending in the vertical direction.

The projections 42B by which the level difference 44B can be made in this manner may be formed on the sliding surface 38 as linear ridges extending in the direction intersecting the sliding direction (front-rear direction in the drawing). Even in the case where the level difference 44B is made as in the third embodiment, the oxidized films formed on the surfaces of the terminal portions 36 can be removed in the same manner as that of the first and second embodiments by the level difference 44B having the projecting shape. Accordingly, the oxidized films formed on the surfaces of the terminal portions 36 can be removed without increasing a burden on the user for maintaining the tool, so that electrical connection between the female terminals 70 and the terminal portions 36 of the male terminals 34 can be maintained desirably and/or satisfactorily over a long period.

Fourth Embodiment

Figure 20:
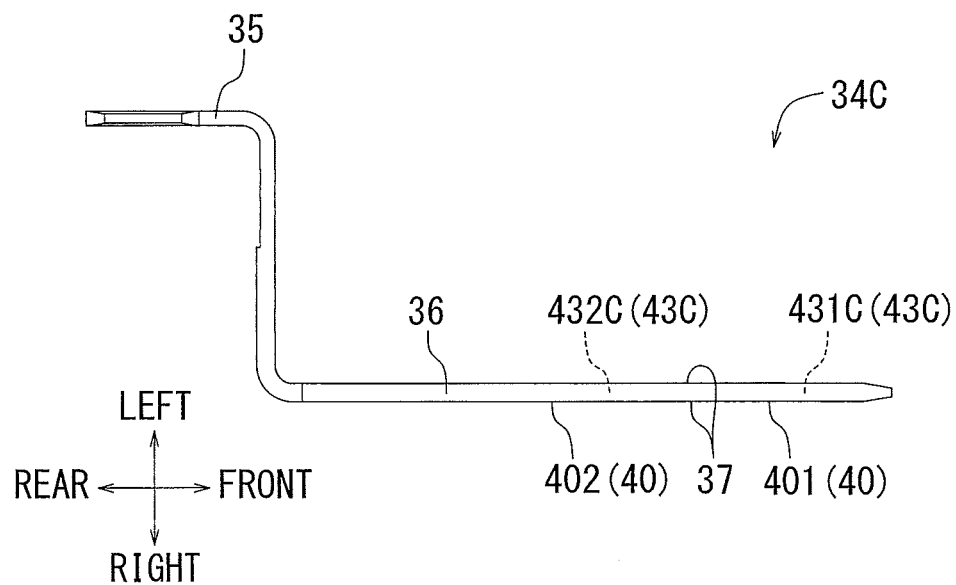
FIG. 20 is an enlarged top view illustrating a male terminal according to a fourth embodiment.
Figure 21:
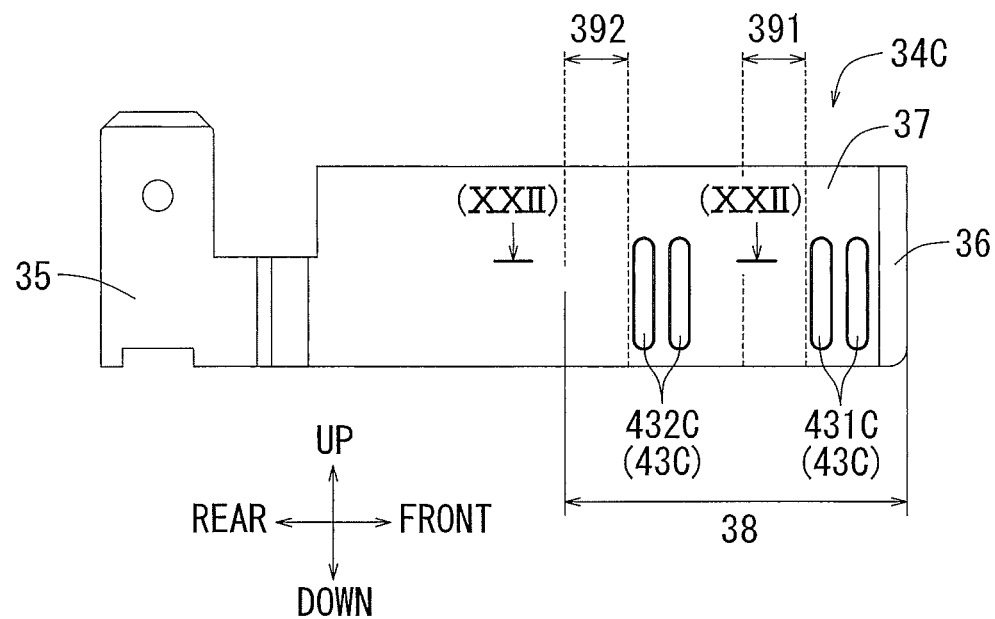
FIG. 21 is an enlarged side view illustrating the male terminal according to the fourth embodiment.
Figure 22:
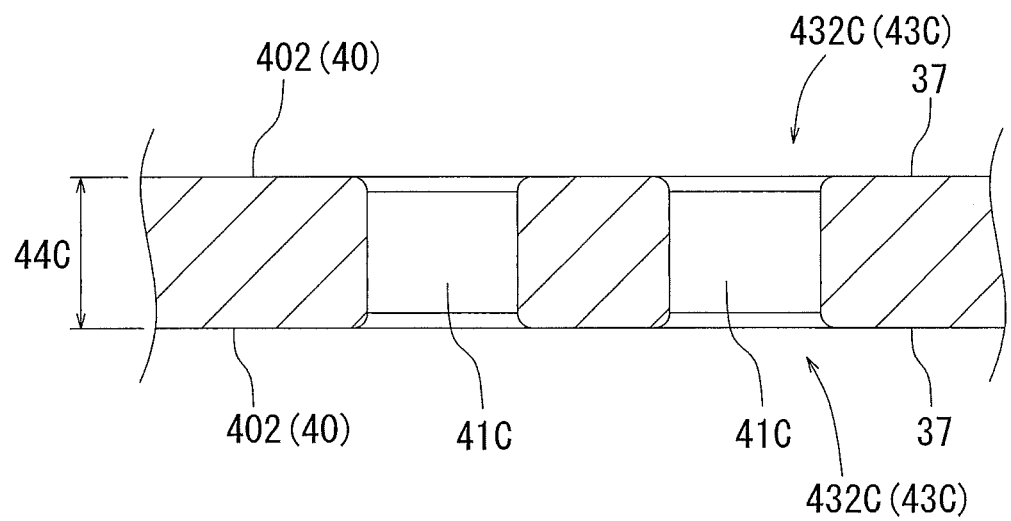
FIG. 22 is an enlarged cross-sectional view taken along a line XXII-XXII in FIG. 21 in an enlarged scale.

The level difference portions may have a configuration in which a plurality of through holes penetrates through the sliding surface 38 of the male terminals 34 in the thickness direction of the plate, i.e. the male terminal 34C. FIG. 20 is an enlarged top view illustrating a male terminal 34C according to a fourth embodiment. FIG. 21 is an enlarged side view illustrating the male terminal 34C according to the fourth embodiment. FIG. 22 is an enlarged cross sectional view illustrating a cross section taken along the line XXII-XXII in FIG. 21 in an enlarged scale. In concavo-convex portions 43C of the fourth embodiment, a front concavo-convex portion 431C may be provided on the front side of the front plane connecting portion 401, and a rear concavo-convex portion 432C may be provided on the front side of the rear plane connecting portion 402 in the same manner as the embodiments described above. As illustrated in FIG. 21 and FIG. 22, the concavo-convex portion 43C of the fourth embodiment may include, for example two elongated holes 41C penetrating in the thickness direction of the plate, i.e. the male terminal 34C. The two elongated holes 41C may be arranged in parallel in the front-rear direction. The elongated holes 41C may correspond to the level difference portions of the present embodiment. The elongated holes 41C may have an elongated hole shape extending vertically. In other words, the elongated holes 41C may have an elongated hole shape penetrating through the terminal portions 36 in the thickness direction of the plate, i.e. the male terminal 34C, so that a level difference 44C may be formed on the planar connecting portions 40.

As illustrated in FIG. 21 and FIG. 22, a plurality of the elongated holes 41C, for example two elongated holes 41C, may be arranged in parallel in the front-rear direction on the sliding surface 38. The elongated holes 41C which form the level difference 44C in this manner may be located on the sliding surface 38 as linear ridges extending in the direction intersecting the sliding direction (front-rear direction in the drawing). Even in the case where the level difference 44C is formed as in the fourth embodiment, the oxidized films formed on the surfaces of the terminal portions 36 can be removed and/or scraped in the same manner as the embodiments described above by the level difference 44C having the elongated hole shape. Thus, the oxidized films formed on the surfaces of the terminal portions 36 can be removed and/or scraped without increasing a burden on the user for maintaining the tool, so that electrical connection between the female terminals 70 and the terminal portions 36 of the male terminals 34C can be maintained desirably and/or satisfactorily over a long period.

Figure 23:
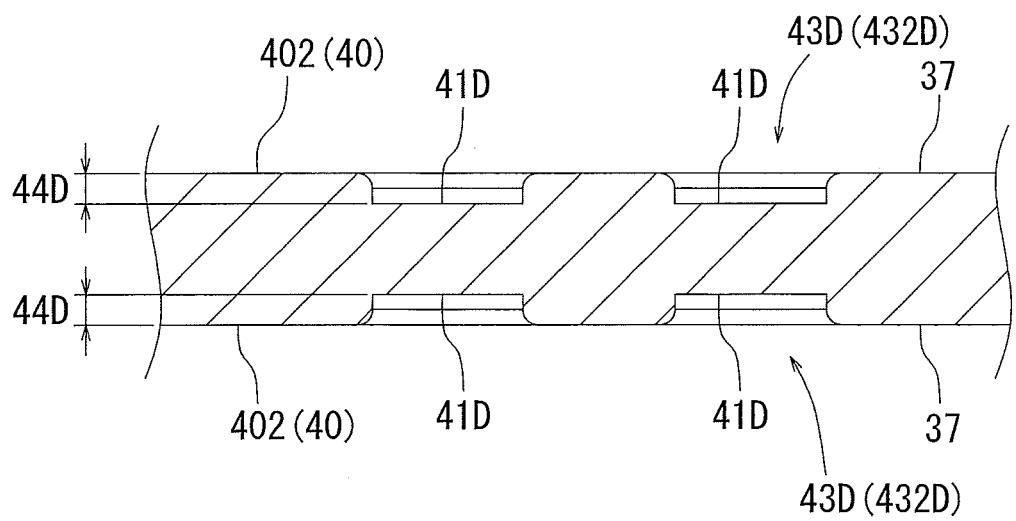
FIG. 23 is an enlarged cross-sectional view illustrating a modified example of the fourth embodiment in FIG. 22.

Furthermore, unlike the elongated holes 41C described above, it may be possible that the level difference portions are simply depressed and/or recessed without penetrating in the thickness direction of the plate, i.e. the male terminal 34C. FIG. 23 is an enlarged cross-sectional view showing a modified configuration of FIG. 22. As illustrated in FIG. 23, concavo-convex portions 43D (432D) may differ from the concavo-convex portion 43C having the elongated holes 41C, in that concavo-convex portions 43D may not be penetrated in the thickness direction of the plate, i.e. the male terminal 34C. On the other hand, concavo-convex portions 43D (432D) may be similar to the concavo-convex portion 43C in that the portions 43D may be depressed significantly in the vertical direction as shown in FIG. 23. As illustrated in FIG. 23, the concavo-convex portions 43D of the fourth embodiment may include two elongated depressed portions 41D concaved in the thickness direction of the plate and be arranged in parallel in the sliding direction. The elongated depressed portions 41D may correspond to the level difference portions of the present embodiment. As illustrated in FIG. 23, the elongated depressed portions 41D may have a depressed and/or recessed shape extending significantly in the vertical direction. In other words, the elongated depressed portions 41D may have the elongated depressed shape extending vertically in the thickness direction of the terminal portions 36, so that a level difference 44D may be formed with respect to the planar connecting portions 40. Even with the configuration of the level difference portions as described above, the oxidized films formed on the surfaces of the terminal portion can be removed and/or scraped by the concavo-convex shape of the level difference 44D.

Although not shown in figures, the level difference portions may be made by emboss processing (projection processing) on the sliding surfaces 38 of the male terminals 34. Furthermore, the level difference portion may include a plurality of dimples formed on the sliding surface 38 of the male terminals 34. Even in a case where the level difference portions are configured to be as described above, the oxidized films formed on the surfaces of the terminal portions may be removed and/or scraped by these concavo-convex portions.

Figure 24:
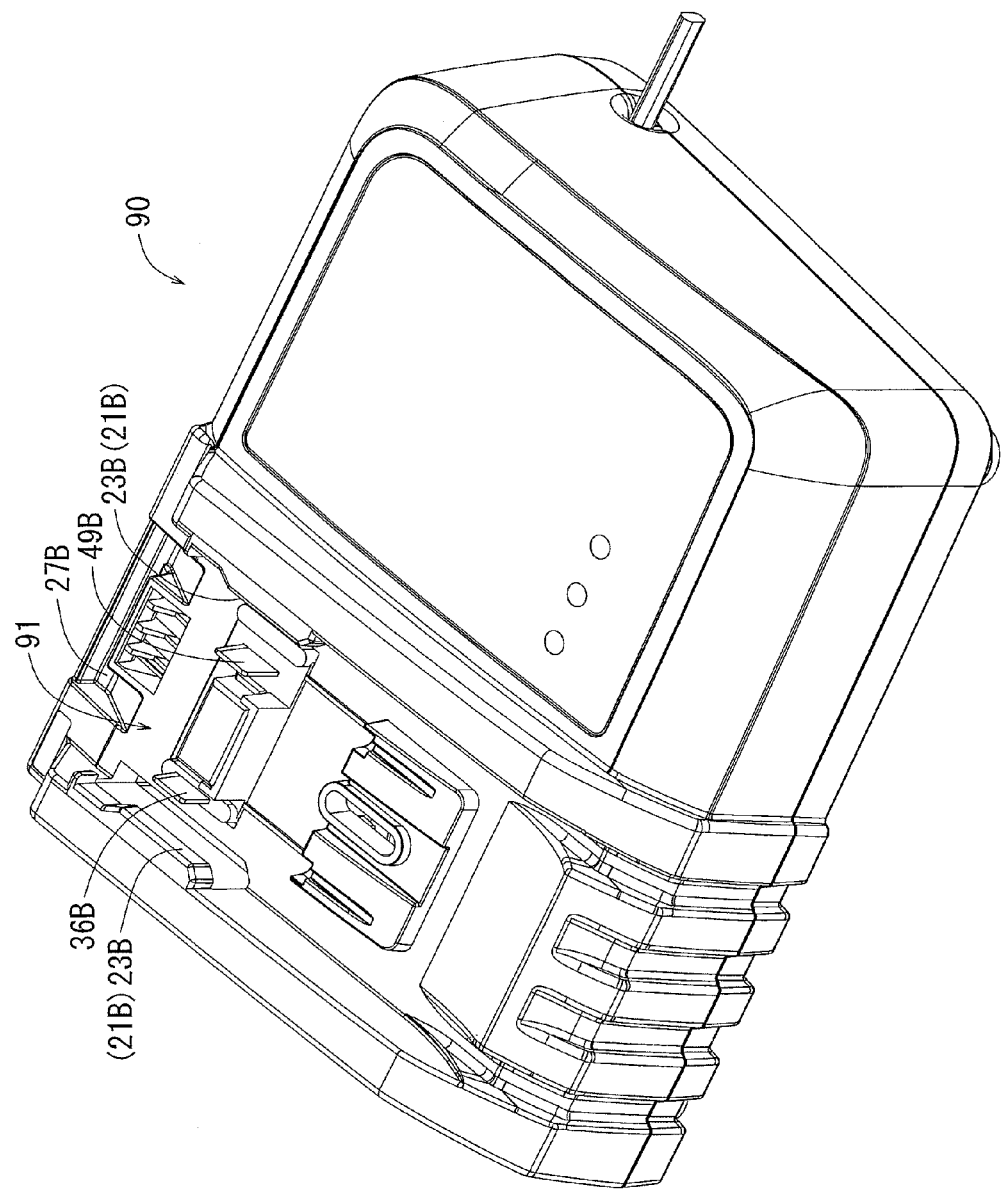
FIG. 24 is a perspective view illustrating a charger.

Furthermore, the female and male connecting structure 30 described above may be applied to a dedicated charger 90 or a battery adapter 95 exemplified below. FIG. 24 is a perspective view of the dedicated charger 90. The illustrated dedicated charger 90 may correspond to an electric apparatus of the present embodiment. The dedicated charger 90 may be for charging the battery pack 50 used as a power source of the electric power tool. The above-described female and male connecting structure 30 may be provided between the battery pack 50 and the dedicated charger 90. The specific charger 90 may be also provided with a battery attachment portion 91, which is substantially the same as the battery attachment portion 20 provided on the tool main body 11 described above. In the battery attachment portion 91 of the specific charger 90, a female rail 23B and a female hook portion 27B which correspond to a female rail structure 21B may be provided. The battery attachment portion 91 may be provided with a terminal portion 36B of the male terminal 34B and the male terminal 49B in the same manner as the embodiments described above. Reference numerals suffixed with an alphabet B to the reference numerals of the members described in the first embodiment are shown in the drawing. In the case of the dedicated charger 90 configured as described above, advantageous effects of the female and male connecting structure 30 may be also obtained between the battery pack 50 and the dedicated charger 90.

Figure 25:
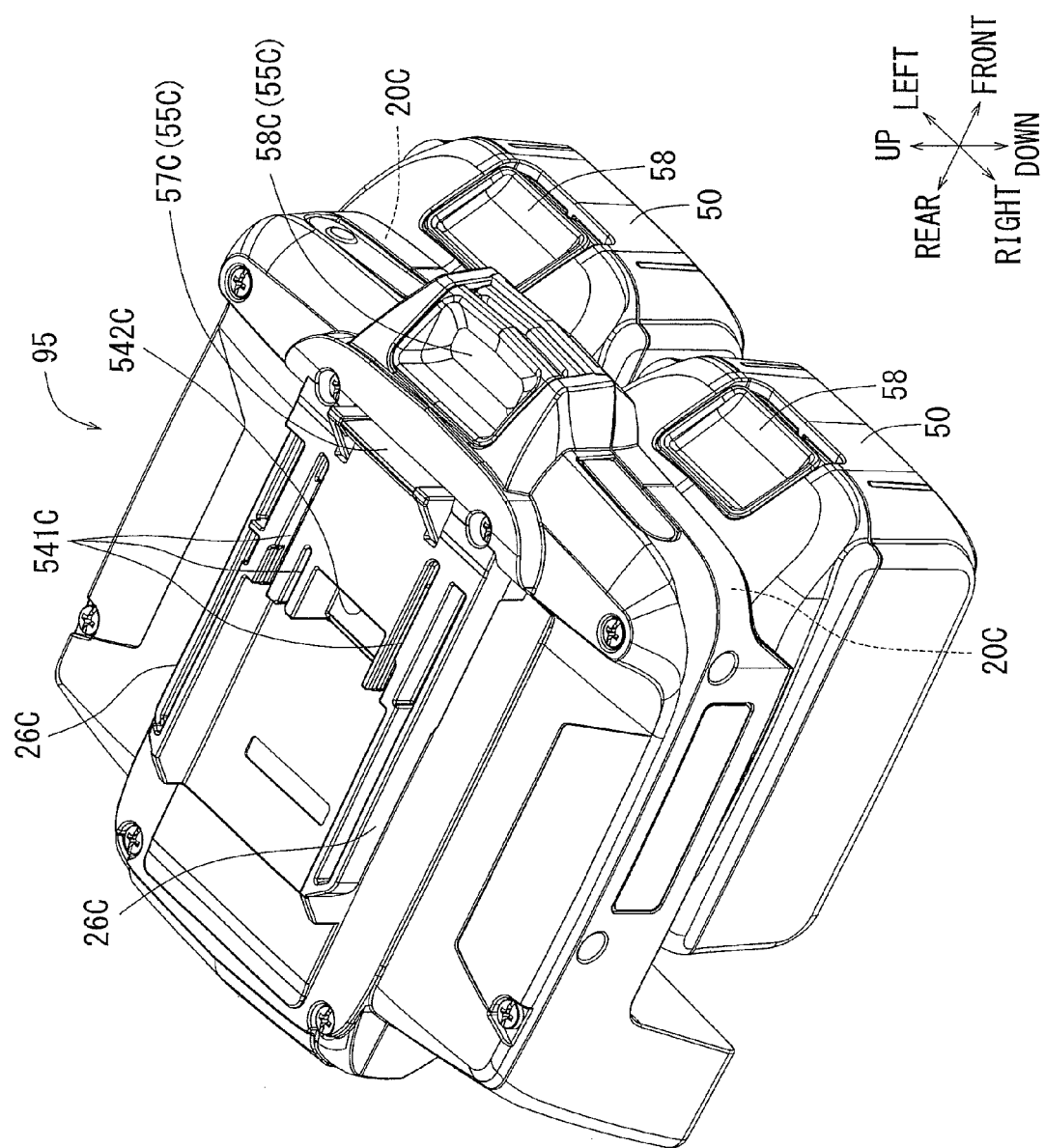
FIG. 25 is a perspective view illustrating a battery adapter.

FIG. 25 is a perspective view of the battery adapter 95. The illustrated battery adapter 95 may correspond to an electric apparatus of the present embodiment. Two battery packs 50 may be attached to the battery adapter 95 for a power source of the electric power tool. The battery adapter 95 may be set between the battery pack 50 and the tool main body 11. Because of this construction, the female and male connecting structure 30 may be provided between the battery pack 50 and the battery adapter 95, and also between the battery adapter 95 and the tool main body 11. Specifically, two battery attachment portions 20C may be provided in parallel on a lower surface of the battery adapter 95 as illustrated in FIG. 25. Accordingly, the battery adapter 95 may be configured to accommodate two battery packs 50.

Furthermore, as illustrated in FIG. 25, the battery adapter 95 may also be provided with a structure on an upper surface side of the battery adapter 95 for attaching the battery adapter 95 to the battery attachment portion 20 of the tool main body 11. Specifically, the battery adapter 95 may be provided with a similar structure to the (attaching) structure of the battery pack 50. Reference numerals suffixed with an alphabet C to the reference numerals of the members described in the first embodiment are placed in the drawing. In the case of the battery adapter 95 configured as described above, advantageous effects of the female and male connecting structure 30 may also be obtained between the battery pack 50 and the battery adapter 95.

The female and male connecting structure of the invention is not limited to the embodiments described above, and may be applied to another embodiments. The female and male connecting structure 30 of the first embodiment and the second embodiment described above may be configured to be provided between the battery pack 50 and the tool main body 11. However, as the female and male connecting structure, any configurations may be applicable as long as the female and male connecting structure can be applied in a technical field relating to the electric power tool and the electric operating machine in which the battery pack for electric power tool is used as a power source. Furthermore, any configurations may be applicable as long as the mutual connecting structure can be obtained by the male and female relationship described above, and may be arranged by applying the female and male connecting structure 30 to the connecting structure of the products as needed. Examples of the electric power tool of the invention may include drive drills, hammer drills, a jigsaw, a hand sew, a reciprocating saw, a blower, a disk grinder, a cleaner, etc. in addition to the impact driver described above. Examples of the electric operating machine of the invention may include a grass cutter, a chain saw, a hedge trimmer, a hedge clipper, a grass trimmer, etc.

What is claimed is:

1. An electric apparatus having a male terminal, the electric apparatus configured to be attached to a battery pack having a female terminal, wherein:
    the male terminal is configured to be electrically connected to the female terminal by sliding the battery pack relatively with respect to the electric apparatus such that the male terminal is inserted to the female terminal in a sliding direction to come into elastic contact with the female terminal;
    the male terminal is configured to have a plate shape, the male terminal extending in the sliding direction and including a side surface with which the female terminal comes into sliding contact;
    a level difference portion is provided in a thickness direction of the male terminal on the side surface of the male terminal; and
    the level difference portion is configured to include an area in which the female terminal comes into sliding contact with the male terminal.

2. The electric apparatus according to claim 1, wherein the level difference portion is provided on both side surfaces of the male terminal.

3. The electric apparatus according to claim 1, wherein:
    the electric apparatus has a signal terminal configured to transmit and receive a signal to and from the battery pack, the signal terminal being a male terminal; and
    the level difference portion is formed in at least one of the male terminals except for the signal terminal.

4. The electric apparatus according to claim 1, wherein the side surface of the male terminal include a planar connection portion with which the female terminal comes into electrically contact when a slide movement of the battery pack with respect to the electric apparatus is completed.

5. The electric apparatus according to claim 4, wherein the level difference portion is configured such that the side surface of the male terminal is concaved from the planar connecting portion in a thickness direction of the male terminal.

6. The electric apparatus according to claim 5, wherein the level difference portion is configured such that a through hole penetrates through the planar connection portion.

7. The electric apparatus according to claim 4, wherein the level difference portion is configured such that the side surface of the male terminal is protruded from the planar connecting portion in a thickness direction of the male terminal.

8. The electric apparatus according to claim 4, wherein the level difference portion has a linear shape extending in a direction intersecting the sliding direction.

9. The electric apparatus according to claim 8, wherein the level difference portion also intersects a direction orthogonal to the sliding direction.

10. The electric apparatus according to claim 4, wherein it is configured such that a plurality of the planar connecting portions of the male terminal are located at a distance in the sliding direction to correspond to a plurality of contact points of the female terminal located at a distance in the sliding direction.

11. The electric apparatus according to claim 1, wherein:
    a first male terminal and a second male terminal are provided; and
    it is configured such that a level difference portion of the first male terminal is brought into sliding contact with a contact point of a first female terminal at the same time when a level difference portion of the second male terminal is brought into sliding contact with a contact point of the second female terminal.

12. The electric apparatus according to claim 11, wherein the first male terminal is configured to correspond to a positive terminal of a power source and the second male terminal is configured to correspond to a negative terminal of the power source.

13. The electric apparatus according to claim 1, wherein the electric apparatus is an electric power tool.

14. The electric apparatus according to claim 1, wherein the electric apparatus is an electric operating machine.

15. The electric apparatus according to claim 1, wherein the electric apparatus is a charger.

16. The electric apparatus according to claim 1, wherein the electric apparatus is an adapter that is placed between the battery pack and another apparatus.

\* \* \* \* \*